US008349966B2

(12) United States Patent
Jiang et al.

(10) Patent No.: US 8,349,966 B2
(45) Date of Patent: *Jan. 8, 2013

(54) MARINE COATINGS

(75) Inventors: Shaoyi Jiang, Redmond, WA (US);
Hong Xue, Seattle, WA (US); Shengfu Chen, Hangzhou (CN)

(73) Assignee: University of Washington, Seattle, WA (US)

( * ) Notice: Subject to any disclaimer, the term of this patent is extended or adjusted under 35 U.S.C. 154(b) by 296 days.

This patent is subject to a terminal disclaimer.

(21) Appl. No.: 12/780,251

(22) Filed: May 14, 2010

(65) Prior Publication Data

US 2010/0249267 A1    Sep. 30, 2010

Related U.S. Application Data

(63) Continuation of application No. PCT/US2008/084098, filed on Nov. 19, 2008.

(60) Provisional application No. 61/074,913, filed on Jun. 23, 2008, provisional application No. 60/989,073, filed on Nov. 19, 2007.

(51) Int. Cl.
*C08F 20/56* (2006.01)
(52) U.S. Cl. ......................................... 525/329.4; 422/6
(58) Field of Classification Search ........................ None
See application file for complete search history.

(56) References Cited

U.S. PATENT DOCUMENTS

| 3,671,502 | A  | 6/1972  | Samour     |
| 4,075,183 | A  | 2/1978  | Kawakami   |
| 4,138,446 | A  | 2/1979  | Kawakami   |
| 4,415,388 | A  | 11/1983 | Korpman    |
| 4,493,926 | A  | 1/1985  | Williams, Jr. |
| 4,985,023 | A  | 1/1991  | Blank      |
| 5,204,060 | A  | 4/1993  | Allenmark  |
| 5,714,360 | A  | 2/1998  | Swan       |
| 5,919,523 | A  | 7/1999  | Sundberg   |
| 6,361,768 | B1 | 3/2002  | Galleguillos |
| 6,486,333 | B1 | 11/2002 | Murayama   |
| 6,897,263 | B2 | 5/2005  | Hell       |
| 7,291,427 | B2 | 11/2007 | Kawamura   |
| 7,306,625 | B1 | 12/2007 | Stratford  |
| 7,335,248 | B2 | 2/2008  | Abou-Nemeh |
| 7,737,224 | B2 | 6/2010  | Willis     |
| 2005/0058689 | A1 | 3/2005  | McDaniel |
| 2006/0240072 | A1 | 10/2006 | Chudzik  |
| 2007/0021569 | A1 | 1/2007  | Willis   |
| 2007/0042198 | A1 | 2/2007  | Schonemyr |

FOREIGN PATENT DOCUMENTS

| DE | 10 2006 004 111 A1 | 8/2007 |
| EP | 0 354 984 A2 | 2/1990 |
| EP | 0 419 654 A1 | 4/1991 |
| EP | 0 479 245 A2 | 4/1992 |
| JP | 63-234007 A | 9/1988 |
| RU | 1780673 A1 | 12/1992 |
| WO | 00/39176 A1 | 7/2000 |
| WO | 2004/058837 A2 | 7/2004 |
| WO | 2004/100666 A1 | 11/2004 |

OTHER PUBLICATIONS

"Betaine," Wikipedia, The Free Encyclopedia, <http://en.wikipedia.org/wiki/Betaine> [retrieved Jul. 31, 2011], 1 page.
"Bromide," Wikipedia, The Free Encyclopedia, <http://en.wikipedia.org/wiki/Bromide> [retrieved Jul. 27, 2011] 3 pages.
"Nail Infections," Health911, <http://www.health911.com/nail-infections> [retrieved Aug. 29, 2011], 3 pages.
International Search Report and Written Opinion mailed Jul. 7, 2009, in corresponding International Application No. PCT/US2008/084098, filed Nov. 19, 2008, 10 pages.
International Preliminary Report on Patentability mailed Jun. 3, 2010, issued in corresponding International Application No. PCT/US2008/084098, filed Nov. 19, 2008, 8 pages.
Chang, Y., et al., "Highly Protein-Resistant Coatings From Well-Defined Diblock Copolymers Containing Sulfobetaines," Langmuir 22(5):2222-2226, Feb. 2006.
Chen, S., et al., "Controlling Antibody Orientation on Charged Self-Assembled Monolayers," Langmuir 19(7):2859-2864, Apr. 2003.
Chen, S., et al., "Strong Resistance of Oligo(phosphorylcholine) Self-Assembled Monolayers to Protein Adsorption," Langmuir 22(6):2418-2421, Mar. 2006.
Chen, S., et al., "Strong Resistance of Phosphorylcholine Self-Assembled Monolayers to Protein Adsorption: Insights Into Nonfouling Properties of Zwitterionic Materials," Journal of the American Chemical Society 127(41):14473-14478, Oct. 2005.
Feng, W., et al., "Adsorption of Fibrinogen and Lysozyme on Silicon Grafted With Poly(2-methacryloyloxyethyl phosphorylcholine) Via Surface-Initiated Atom Transfer Radical Polymerization," Langmuir 21(13):5980-5987, Jun. 2005.
Feng., W., et al., "Atom-Transfer Radical Grafting Polymerization of 2-Methacryloyloxyethyl Phosphorylcholine From Silicon Wafer Surfaces," Journal of Polymer Science: Part A: Polymer Chemistry 42(12):2931-2942, Jun. 2004.
Jiang, Y., et al., "Blood Compatibility of Polyurethane Surface Grafted Copolymerization With Sulfobetaine Monomer," Colloids and Surfaces B: Biointerfaces 36(1):27-33, Jul. 2004.
Jun, Z., et al., "Surface Modification of Segmented Poly(ether urethane) by Grafting Sulfo Ammonium Zwitterionic Monomer to Improve Hemocompatibilities," Colloids and Surfaces B: Biointerfaces 28(1):1-9, Apr. 2003. Li, L., et al., "Protein Adsorption on Alkanethiolate Self-Assembled Monolayers: Nanoscale Surface Structural and Chemical Effects," Langmuir 19(7):2974-2982, Apr. 2003.
Li, L. et al "Protein Adsorption on Oligo(ethylene glycol)-Terminated Alkanethiolate Self-Assembled Monolayers: The Molecular Basis for Nonfouling Behavior," Journal of Physical Chemistry B 109(7):2934-2941, Feb. 2005.
Lowe, A.B., et al., "Well-Defined Sulfobetaine-Based Statistical Copolymers as Potential Antibioadherent Coatings," Journal of Biomedical Materials Research 52(1):88-94, Jul. 2000.
West, S.L., et al., "The Biocompatibility of Crosslinkable Copolymer Coatings Containing Sulfobetaines and Phosphobetaines," Biomaterials 25(7-8):1195-1204, Mar.-Apr. 2004.
Yuan, J., et al., "Chemical Graft Polymerization of Sulfobetaine Monomer on Polyurethane Surface for Reduction in Platelet Adhesion," Colloids and Surfaces B: Biointerfaces 39(1-2):87-94, Nov. 2004.

(Continued)

*Primary Examiner* — James Rogers
(74) *Attorney, Agent, or Firm* — Christensen O'Connor Johnson Kindness PLLC

(57) ABSTRACT

Marine coatings including cationic polymers hydrolyzable to nonfouling zwitterionic polymers, coated marine surfaces, and methods for making and using the marine coatings.

22 Claims, 25 Drawing Sheets
(13 of 25 Drawing Sheet(s) Filed in Color)

OTHER PUBLICATIONS

Yuan, J., et al., "Improvement of Blood Compatibility on Cellulose Membrane Surface by Grafting Betaines," Colloids and Surfaces B: Biointerfaces 30(1-2):147-155, Jul. 2003.

Yuan, J., "Platelet Adhesion Onto Segmented Polyurethane Surfaces Modified by Carboxybetaine," Journal of Biomaterial Science, Polymer Edition 14(12):1339-1349, Dec. 2003.

Yuan, Y., et al., "Grafting Sulfobetaine Monomer Onto Silicone Surface to Improve Haemocompatability," Polymer International 53(1):121-126, Jan. 2004.

Yuan, Y., et al. "Grafting Sulfobetaine Monomer Onto the Segmented Poly(ether-urethane) Surface to Improve Hemocompatability," Journal of Biomaterials Science, Polymer Edition 13(10):1081-1092, Oct. 2002.

Yuan, Y., et al., "Polyurethane Vascular Catheter Surface Grafted With Zwitterionic Sulfobetaine Monomer Activated by Ozone," Colloids and Surfaces B: Biointerfaces 35(1):1-5, May 2004.

Yuan, Y., et al., "Surface Modification of SPEU Films by Ozone Induced Graft Copolymerization to Improve Hemocompatibility," Colloids and Surfaces B: Biointerfaces 29(4):247-256, Jun. 2003.

Zhang, J., et al., "Chemical Modification of Cellulose Membranes With Sulfo Ammonium Zwitterionic Vinyl Monomer to Improve Hemocompatibility," Colloids and Surfaces B: Biointerfaces 30(3):249-257, Jul. 2003.

Zhang, Z., et al., "The Hydrolysis of Cationic Polycarboxybetaine Esters to Zwitterionic Polycarboxybetaines With Controlled Properties," Biomaterials 29(36):4719-4725, Dec. 2008.

Zhang, Z., et al., "Superflow Fouling Sulfobetaine and Carboxybetaine Polymers on Glass Slides," Langmuir 22(24):10072-10077, Nov. 2006.

Zhang, Z., "Surface Grafted Sulfobetaine Polymers Via Atom Transfer Radical Polymerization as Superlow Fouling Coatings," Journal of Physical Chemistry B 110(22)10799-10804, Jun. 2006.

Zheng, J., "Molecular Simulation Study of Water Interactions With Oligo (Ethylene Glycol)-Terminated Alkanethiol Self-Assembled Monolayers," Langmuir 20(20):8931-8938, Sep. 2004.

Zheng, J., "Strong Repulsive Forces Between Protein and Oligo (Ethylene Glycol) Self-Assembled Monolayers: A Molecular Simulation Study," Biophysical Journal 89(1):158-166, Jul. 2005.

Zhou, J., et al., "Platelet Adhesion and Protein Adsorption on Silicone Rubber Surface by Ozone-Induced Grafted Polymerization With Carboxybetaine Monomer," Colloids and Surfaces B: Biointerfaces 41(1):55-62, Mar. 2005.

*FIG. 20C.*
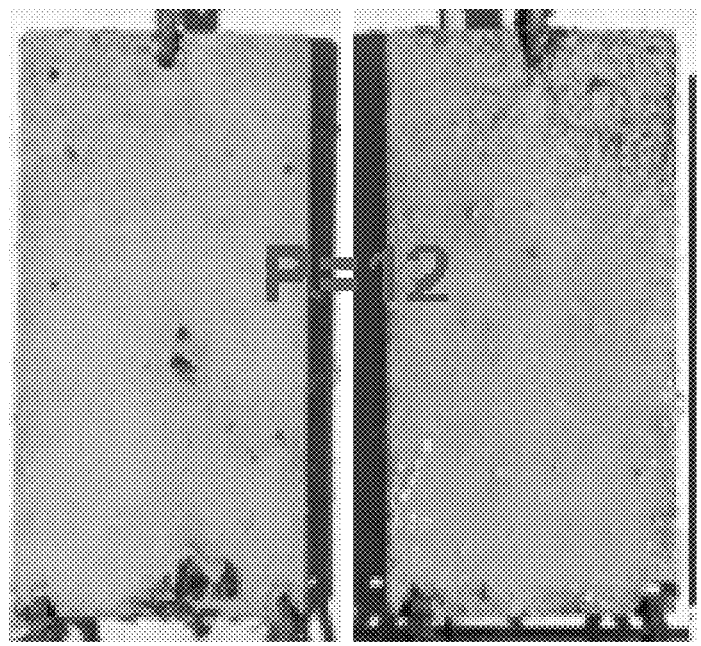
*FIG. 20D-E*

*FIGS. 22A-B.*

MARINE COATINGS

CROSS-REFERENCES TO RELATED APPLICATIONS

This application is a continuation of International Application No. PCT/US2008/084098, filed Nov. 19, 2008, which claims the benefit of U.S. Provisional Application No. 60/989,073, filed Nov. 19, 2007, and U.S. Provisional Application No. 61/074,913, filed Jun. 23, 2008. Each application is incorporated herein by reference in its entirety.

STATEMENT OF GOVERNMENT LICENSE RIGHTS

This invention was made with Government support under Grant Numbers N00014-04-1-0409 and N00014-07-1036 awarded by Office of Naval Research and Grant Number AB06BAS759 awarded by the Defense Threat Reduction Agency. The Government has certain rights in the invention.

BACKGROUND OF THE INVENTION

Biofouling on ship hulls and other marine surfaces has become a global environmental and economic issue. Currently, the majority of marine coating products are based on antifouling coatings (i.e., release of biocides to kill marine microorganisms). As biocides are harmful to the marine environment, their application is highly limited. Nontoxic fouling-release coatings based on silicone compounds have been marketed, but have not gained popularity yet. These coatings are only effective on vessels moving at high speeds (greater than 14 knots). Furthermore, these coatings are expensive in terms of material, application, and maintenance.

Superlow fouling zwitterionic materials and coatings enables the development of nonfouling marine coatings. Poly(ethylene glycol) (PEG) derivatives or zwitterionic polymers have been extensively used as nonfouling materials to reduce bacterial attachment and biofilm formation. However, the susceptibility of PEG to oxidation damage has limited its long-term application in complex media. Zwitterionic materials such as poly(sulfobetaine methacrylate) (pSBMA) are able to dramatically reduce bacterial attachment and biofilm formation and are highly resistant to nonspecific protein adsorption.

Despite the advances made in marine coatings, there exists a need for new marine coatings that offer advantageous properties of self-polishing/non-fouling and superhydrophobic/nonfouling. The present invention seeks to fulfill this need and provides further related advantages.

SUMMARY OF THE INVENTION

The invention provides marine coatings that include polymers, methods for making the coatings, marine surface coated with the coatings, and methods for applying the coatings to marine vessels.

In one aspect, the invention provides marine coatings.

In one embodiment, the marine coating includes a cationic polymer comprising:
(a) polymer backbone;
(b) a plurality of cationic centers, each cationic center covalently coupled to the polymer backbone by a first linker;
(c) a counter ion associated with each cationic center; and
(d) a hydrolyzable group covalently coupled to each cationic center through a second linker, wherein the hydrolyzable group is hydrolyzable to an anionic center to provide a zwitterionic polymer having the anionic center covalently coupled to the cationic center through the second linker.

In one embodiment, the polymer has the formula:

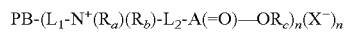

wherein

PB is the polymer backbone having n pendant groups $L_1$-$N^+(R_a)(R_b)$-$L_2$-$A(=O)$—$OR_c$);

$N^+$ is the cationic center;

$R_a$ and $R_b$ are independently selected from hydrogen, alkyl, and aryl;

$A(=O)$—$OR_c$ is the hydrolyzable group, wherein A is selected from the group consisting of C, S, SO, P, or PO, and $R_c$ is an alkyl, aryl, acyl, or silyl group that may be further substituted with one or more substituents;

$L_1$ is a linker that covalently couples the cationic center to the polymer backbone;

$L_2$ is a linker that covalently couples the cationic center to the hydrolyzable group;

$X^-$ is the counter ion associated with the cationic center; and n is an integer from about 10 to about 10,000.

In one embodiment, the counter ion is a hydrophobic organic counter ion. Representative counter ions include C1-C20 carboxylates and C1-C20 alkylsulfonates.

In certain embodiments, the counter ion is biologically active. Representative counter ions include antimicrobial, antibacterial, and antifungal agents. In one embodiment, the counter ion is salicylate.

In certain embodiments, the hydrolyzable group releases a hydrophobic organic group on hydrolysis. In one embodiment, the hydrolyzable group releases a C1-C20 carboxylate on hydrolysis.

In certain embodiments, the hydrolyzable group releases a biological active on hydrolysis. Representative biological actives include antibacterial and antifungal agents.

Representative cationic centers include ammonium, imidazolium, triazaolium, pyridinium, morpholinium, oxazolidinium, pyrazinium, pyridazinium, pyrimidinium, piperazinium, and pyrrolidinium.

In one embodiment, $R_a$ and $R_b$ are independently selected from the group consisting of C1-C10 straight chain and branched alkyl groups.

In one embodiment, $L_1$ is selected from the group consisting of —C(=O)O—$(CH_2)_n$— and —C(=O)NH—$(CH_2)_n$—, wherein n is an integer from 1 to 20.

In one embodiment, $L_2$ is —$(CH_2)_n$—, where n is an integer from 1 to 20.

In one embodiment, A is selected from the group consisting of C, SO, and PO.

In one embodiment, $R_c$ is C1-C20 alkyl.

In one embodiment, $X^-$ is selected from the group consisting of halide, carboxylate, alkylsulfonate, sulfate; nitrate, perchlorate, tetrafluoroborate, hexafluorophosphate, trifluoromethylsulfonate, bis(trifluoromethylsulfonyl)amide, lactate, and salicylate.

In another embodiment, the marine coating includes a copolymer having the formula:

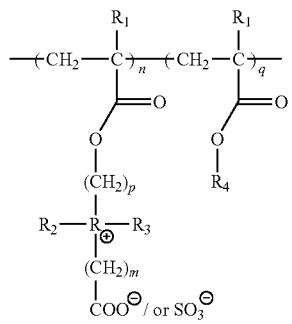

wherein $R_1$ is independently at each occurrence selected from the group consisting of hydrogen, methyl, and ethyl;

$R_2$ and $R_3$ are independently selected from the group consisting of C1-C20 alkyl and fluoroalkyl;

$R_4$ is selected from the group consisting of C1-C20 alkyl, C6-C12 aryl, and tri(C1-C8 alkyl) silyl;

R is a cationic center selected from ammonium, imidazolium, triazaolium, pyridinium, morpholinium, oxazolidinium, pyrazinium, pyridazinium, pyrimidinium, piperazinium, and pyrrolidinium;

m is an integer from 1 to 20;

n is an integer from 5 to about 100,000;

p is an integer from 1 to 20; and q is an integer from 5 to about 100,000.

In one embodiment, $R_4$ is C4-C12 alkyl.

In a further embodiment, the marine coating includes a copolymer having the formula:

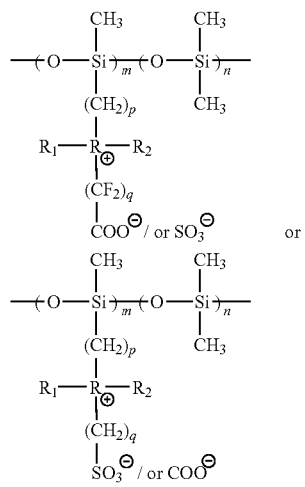

wherein $R_1$ and $R_2$ are independently selected from C1-C20 alkyl and fluoroalkyl;

R is a cationic center selected from ammonium, imidazolium, triazaolium, pyridinium, morpholinium, oxazolidinium, pyrazinium, pyridazinium, pyrimidinium, piperazinium, and pyrrolidinium;

p is an integer from 1 to 20;

q is an integer from 1 to 20;

m is an integer from 5 to about 100,000; and n is an integer from 5 to about 100,000.

For the above copolymers, in one embodiment, R is ammonium. In one embodiment, the copolymer is a block copolymer.

The marine coatings of the invention can further include a binder polymer. Representative binder polymers include rosins, acrylic polymers, polyesters, amino resins, polyurethanes, polyamides, polyimides, epoxy and phenolic resins, alkyd resins, polyphosphazenes, polysiloxanes, and mixtures thereof.

In another aspect, the invention provides a surface of a marine substrate treated with a marine coating of the invention. Representative substrates include marine vessel hulls and marine structures such as propellers, periscopes, and sensors. Other marine structures that can be advantageously coated with a marine coating of the invention include bridges and fish nets.

In a further aspect of the invention, a method for treating a surface of a marine substrate is provided. In the method, a marine coating of the invention is applied to a surface of a marine substrate. In one embodiment, applying the coating includes spraying the coating. In another embodiment, applying the coating comprises painting the coating.

DESCRIPTION OF THE DRAWINGS

The patent of application file contains at least one drawing executed in color. Copies of this patent or patent application publication with color drawing(s) will be provided by the Office upon request and payment of the necessary fee.

The foregoing aspects and many of the attendant advantages of this invention will become more readily appreciated as the same become better understood by reference to the following detailed description, when taken in conjunction with the accompanying drawings, wherein:

FIGS. 20A-20F are photographs comparing Florida field test panels: FIG. 20A is an epoxy panel; FIG. 20B is a PVC panel; and FIGS. 20C-20F are panels treated with a representative cationic polymer of the invention illustrated in FIG. 23 (m=11).

FIGS. 22A-22D are photographs comparing Hawaii field test panels: FIGS. 22A and 22B are epoxy panels; FIG. 22C is a Hempasil panel; and FIG. 22D is a panel treated with the representative block copolymer of the invention illustrated in FIG. 28 (p=11) (block copolymer nanoparticles mixed with hydrolyzable silyl ester binder polymers).

DETAILED DESCRIPTION OF THE INVENTION

Figure 1:
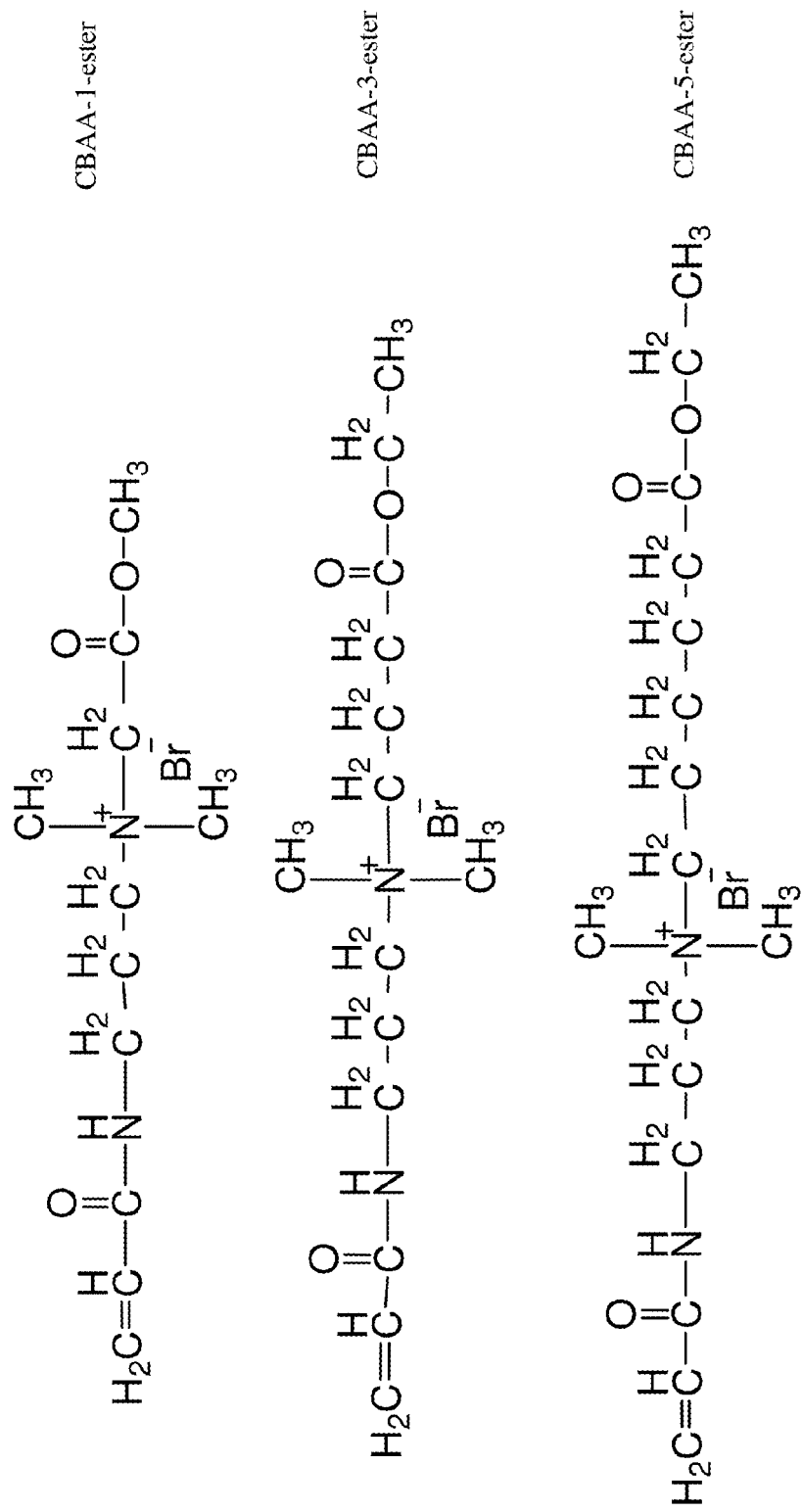
FIG. 1 illustrates the structures of three representative cationic monomers useful for making cationic polymers useful in the invention: three acrylamide monomers with different carboxybetaine ester groups; CBAA-1-ester, CBAA-3-ester, and CBAA-5-ester.

The invention provides marine coatings that include cationic polymers having hydrolyzable groups, methods for making the coatings, and methods for applying the coatings to marine vessels.

In one aspect of the invention, marine coatings that include cationic polymers are provided. The cationic polymers useful in the invention include hydrolyzable groups that can be hydrolyzed to provide zwitterionic polymers. Zwitterionic polymers are polymers having a balance of positive and negative charge. Zwitterionic polymers can be highly resistant to protein adsorption and bacterial adhesion. Due to their biomimetic nature, zwitterionic polymers, such as phosphobetaine, sulfobetaine, and carboxybetaine polymers, exhibit high biocompatibility and are environmentally benign.

Controlled Hydrolysis. The variation of the structural features of the cationic polymers allows for their controlled hydrolysis and the control of the biological, chemical, and mechanical properties. The rate of hydrolysis can be significantly affected and controlled by the selection of the nature of the hydrolyzable group (e.g., for esters, —OR).

As described below, in certain embodiments, the cationic polymers useful in the invention advantageously release functional groups on hydrolysis. For example, for cationic esters useful in the invention, hydrolysis ester releases an —OR group. In these embodiments, the released group can be a therapeutic agent (e.g., an antimicrobial, antibacterial, an antifungal agent). Similarly, in certain embodiments, the cationic polymers can release their counter ions (X$^-$), which can also be biologically active (e.g., antimicrobial and antibacterial agents).

It will be appreciated that the hydrolyzable group can be cleaved not only by hydrolysis, but also by cleavage (e.g., degradation or erosion) that occurs by other means. The cationic polymers can be converted to their corresponding zwitterionic polymers by environmental changes due to enzymatic catalysis, redox, heat, light, ionic strength, pH, and hydrolysis, among others.

Representative cationic polymers useful in the invention and their corresponding zwitterionic polymer counterparts are described below.

Cationic Polymers

The cationic polymers useful in the invention include hydrolyzable groups that, when hydrolyzed, provide anionic groups that render the polymer zwitterionic. In each polymer, the number of hydrolyzable groups is substantially equal to the number of cationic groups such that, when the hydrolyzable groups are hydrolyzed, in the resulting polymer is zwitterionic. As used herein, the term "zwitterionic polymer" refers to a polymer having substantially equal numbers of cationic groups and anionic groups.

Representative cationic polymers useful in the invention have formula (I):

wherein PB is the polymer backbone having n pendant groups (i.e., $L_1$-$N^+$($R_a$)($R_b$)-$L_2$-A(=O)—$OR_c$); $N^+$ is the cationic center; $R_a$ and $R_b$ are independently selected from hydrogen, alkyl, and aryl groups; A(=O)—$OR_c$) is the hydrolyzable group, wherein A is C, S, SO, P, or PO, and $R_c$ is an alkyl, aryl, acyl, or silyl group that may be further substituted with one or more substituents; $L_1$ is a linker that covalently couples the cationic center to the polymer backbone; $L_2$ is a linker that covalently couples the cationic center to the hydrolyzable group; $X^-$ is the counter ion associated with the cationic center; and n is from about 10 to about 10,000. The average molecular weight of the polymers of formula (I) is from about 1 kDa to about 1,000 kDa.

Hydrolysis of the cationic polymer of formula (I) provides zwitterionic polymer having formula (II):

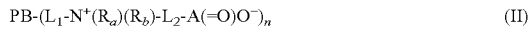

wherein PB, $L_1$, $N^+$, $R_a$, $R_b$, $L_2$, A, and n are as described above, and A(=O)$O^-$ is the anionic group.

In this embodiment, the polymer of formula (I) includes n pendant groups and can be prepared by polymerization of monomers having formula (III):

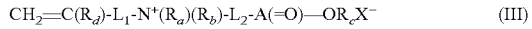

wherein $L_1$, $N^+$, $R_a$, $R_b$, A(=O)$OR_c$, and $L_2$, and $X^-$ are as described above, $R_d$ is selected from hydrogen, fluorine, trifluoromethyl, C1-C6 alkyl, and C6-C12 aryl groups.

The following is a description of the polymers and monomers of formulas (I)-(III) described above.

In formulas (I) and (II), PB is the polymer backbone. Representative polymer backbones include vinyl backbones (i.e., —C(R')(R")—C(R∝")(R"")—, where R', R", R"', and R"" are independently selected from hydrogen, alkyl, and aryl) derived from vinyl monomers (e.g., acrylate, methacrylate, acrylamide, methacrylamide, styrene). Other suitable backbones include polymer backbones that provide for pendant cationic groups that include hydrolyzable groups that can be converted to zwitterionic groups, and backbones that include cationic groups and that provide for pendant hydrolyzable groups that can be converted to zwitterionic groups. Other representative polymer backbones include peptide (polypeptide), urethane (polyurethane), and epoxy backbones.

Similarly, in formula (III), $CH_2$=C($R_d$)— is the polymerizable group. It will be appreciated that other polymerizable groups, including those noted above, can be used to provide the monomers and polymers of the invention.

In formulas (I)-(III), $N^+$ is the cationic center. In certain embodiments, the cationic center is a quaternary ammonium (N bonded to $L_1$; $R_a$, $R_b$, and $L_2$). In addition to ammonium, other useful cationic centers include imidazolium, triazaolium, pyridinium, morpholinium, oxazolidinium, pyrazinium, pyridazinium, pyrimidinium, piperazinium, and pyrrolidinium.

$R_a$ and $R_b$ are independently selected from hydrogen, alkyl, and aryl groups. Representative alkyl groups include C1-C10 straight chain and branched alkyl groups. In certain embodiments, the alkyl group is further substituted with one of more substituents including, for example, an aryl group (e.g., —$CH_2C_6H_5$, benzyl). In one embodiment, $R_a$ and $R_b$ are methyl. Representative aryl groups include C6-C12 aryl groups including, for example, phenyl. For certain embodiments of formulas (I)-(III), $R_2$ or $R_3$ is absent.

$L_1$ is a linker that covalently couples the cationic center to the polymer backbone. In certain embodiments, $L_1$ includes a functional group (e.g., ester or amide) that couples the remainder of $L_1$ to the polymer backbone (or polymerizable moiety for the monomer of formula (III)). In addition to the functional group, $L_1$ can include an C1-C20 alkylene chain. Representative $L_1$ groups include —C(=O)O—$(CH_2)_n$— and —C(=O)NH—$(CH_2)_n$—, where n is 1-20 (e.g., 3).

$L_2$ is a linker that covalently couples the cationic center to the hydrolyzable group (or anionic group for the zwitterionic polymer of formula (II)). $L_2$ can be a C1-C20 alkylene chain. Representative $L_2$ groups include —$(CH_2)_n$—, where n is 1-20 (e.g., 1, 3, or 5).

The hydrophobicity and the rate of hydrolysis of the cationic polymers of formula (I) can be controlled by $L_1$ and/or $L_2$. The greater the hydrophobicity of $L_1$ or $L_2$, the slower the hydrolysis of the hydrolyzable group and the conversion of the cationic polymer to the zwitterionic polymer.

A(=O)—$OR_c$ is the hydrolyzable group. The hydrolyzable group can be an ester, such as a carboxylic acid ester (A is C), a sulfinic acid ester (A is S), a sulfonic acid ester (A is SO), a phosphinic acid ester (A is P), or a phosphonic acid ester (A is PO). The hydrolyzable group can also be an anhydride. $R_c$ is an alkyl, aryl, acyl, or silyl group that may be further substituted with one or more substituents.

Representative alkyl groups include C1-C30 straight chain and branched alkyl groups. In certain embodiments, the alkyl group is further substituted with one of more substituents including, for example, an aryl group (e.g., —$CH_2C_6H_5$, benzyl). In certain embodiments, $R_c$ is a C1-C20 straight chain alkyl group. In one embodiment, $R_c$ is methyl. In another embodiment, $R_c$ is ethyl. In one embodiment, $R_c$ is a C3-C20 alkyl. In one embodiment, $R_c$ is a C4-C20 alkyl. In one embodiment, $R_c$ is a C5-C20 alkyl. In one embodiment, $R_c$ is a C6-C20 alkyl. In one embodiment, $R_c$ is a C8-C20 alkyl. In one embodiment, $R_c$ is a C10-C20 alkyl. For applications where relatively slow hydrolysis is desired, $R_c$ is a C4-C20 n-alkyl group or a C4-C30 n-alkyl group.

Representative aryl groups include C6-C12 aryl groups including, for example, phenyl including substituted phenyl groups (e.g., benzoic acid).

Representative acyl groups (—C(=O)$R_e$) include acyl groups where $R_e$ is C1-C20 alkyl or C6-C12 aryl.

Representative silyl groups (—$SiR_3$) include silyl groups where R is C1-C20 alkyl or C6-C12 aryl).

In certain embodiments of the invention, the hydrolysis product $R_cO^-$ (or $R_cOH$) is biologically active (e.g., an antimicrobial agent, such as salicylic acid (2-hydroxybenzoic acid), benzoate, lactate, and the anion form of an antibiotic or antifungal drug).

In certain other embodiments, the hydrolysis product $R_cO^-$ (or $R_cOH$) is a lactate, glycolate, or an amino acid.

The rate of hydrolysis of the cationic polymers of formula (I) can also be controlled by $R_c$. The slower the hydrolysis of the hydrolyzable group due to, for example, steric and/or kinetic effects due to $R_c$, the slower the conversion of the cationic polymer to the zwitterionic polymer.

$X^-$ is the counter ion associated with the cationic center. The counter ion can be the counter ion that results from the synthesis of the cationic polymer of formula (I) or the monomers of formula (III) (e.g., $Cl^-$, $Br^-$, $I^-$). The counter ion that is initially produced from the synthesis of the cationic center can also be exchanged with other suitable counter ions to provide polymers having controllable hydrolysis properties and other biological properties.

The rate of hydrolysis of the cationic polymers of formula (I) can be controlled by the counter ion. The more hydrophobic the counter ion, the slower the hydrolysis of the hydrolyzable group and the slower the conversion of the cationic polymer to the zwitterionic polymer. Representative hydrophobic counter ions include carboxylates, such as benzoic acid and fatty acid anions (e.g., $CH_3(CH_2)_nCO_2^-$ where n=1-19); alkyl sulfonates (e.g., $CH_3(CH_2)_nSO_3^-$ where n=1-19); salicylate; lactate; bis(trifluoromethylsulfonyl)amide anion ($N^-(SO_2CF_3)_2$); and derivatives thereof. Other counter ions also can be chosen from chloride, bromide, iodide, sulfate; nitrate; perchlorate ($ClO_4$); tetrafluoroborate ($BF_4$); hexafluorophosphate ($PF_6$); trifluoromethylsulfonate ($SO_3CF_3$); and derivatives thereof.

Other suitable counter ions include hydrophobic counter ions and counter ions having biological activity (e.g., an antimicrobial agent, such as salicylic acid (2-hydroxybenzoic acid), benzoate, lactate, and the anion form of an antibiotic or and antifungal drug).

For the monomer of formula (III), $R_d$ is selected from hydrogen, fluoride, trifluoromethyl, and C1-C6 alkyl (e.g., methyl, ethyl, propyl, butyl). In one embodiment, $R_d$ is hydrogen. In one embodiment, $R_d$ is methyl. In another embodiment, $R_d$ is ethyl.

The variation of the structural features of the cationic polymers allows for their controlled hydrolysis and the control of the biological, chemical, and mechanical properties. The structural features of the cationic polymers noted above that can be varied to achieve the desired controlled hydrolysis of the polymer include $L_1$, $L_2$, $R_a$, $R_b$, A, $R_c$, and $X^-$. In general, the more hydrophobic the polymer or the noted structural feature, the slower the hydrolysis of the cationic polymer to the zwitterionic polymer.

Homopolymers, Random Copolymers, Block Copolymers. The cationic polymers useful in the invention include homopolymers, random copolymers, and block copolymers.

In one embodiment, the invention provides cationic homopolymers, such as defined by formula (I), prepared by polymerizing a cationic monomer, such as defined by formula (III). It will be appreciated that the advantageous properties associated with cationic polymers useful in the invention including those polymers defined by formula (I) can be imparted to other polymeric materials.

In one embodiment, the invention provides random copolymers prepared by copolymerizing two different cationic monomers of formula (III).

In another embodiment, the invention provides random copolymers that include cationic repeating units prepared by copolymerizing one or more cationic monomers of the invention defined by formula (III) with one or more other monomers (e.g., hydrophobic monomers, anionic monomers, or zwitterionic monomers, such as phosphorylbetaine, sulfobetaine, or carboxybetaine monomers).

In one embodiment, the invention provides block copolymers having one or more blocks comprising cationic repeating units and one or more other blocks. In this embodiment, the one or more blocks that include cationic repeating units include only cationic repeating units (e.g., homo- or copolymer prepared from cationic monomers of formula (III)). Alternatively, the one or more blocks that include cationic repeating units include cationic repeating units and other repeating units (e.g., hydrophobic, anionic, zwitterionic repeating units).

Other Suitable Polymers

The invention also provides the following polymers.

In one embodiment, the cationic polymer has the following structure:

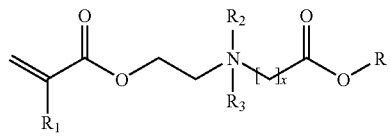

$R_1$=—H, —$CH_3$, —$C_2H_5$
$R_2$=no atom, —H, —$CH_3$, —$C_2H_5$
$R_3$=—H, —$CH_3$, —$C_2H_5$
x=1-8.
R=any alkyl chain, aromatic or lactate or glycolate

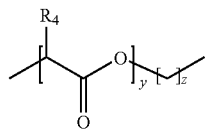

$R_4$=—H, —$CH_3$, —$C_2H_5$
Y=1-10
Z=0-22
or C(=O)R'
R'=any alkyl chain or aromatic group.

In another embodiment, the cationic polymer has the following structure:

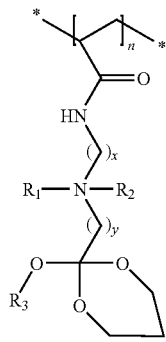

n>5
x=1-5
y=1-5
$R_1$=H, or alkyl chain
$R_2$=no atom, H, or alkyl chain
$R_3$=alkyl chain.

In another embodiment, the invention provides a polymer having the following structure:

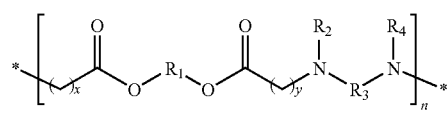

$R_1$ is any alkyl chain
$R_3$ is any alkyl chain
$R_2$, $R_4$ is any alkyl chain
x=1-18
y=1-18
n>3.

In another embodiment, the invention provides a polymer having the following structure:

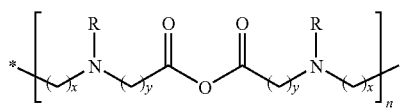

R is alkyl chain
x=1-18
y=1-18
n>3.

In another embodiment, the invention provides a polymer having the following structure:

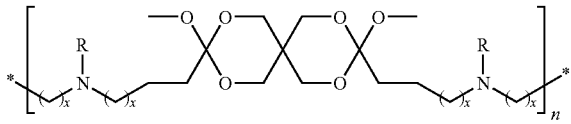

R=any alkyl chain
x=0-11
n>3.

In another embodiment, the invention provides a polymer having the following structure:

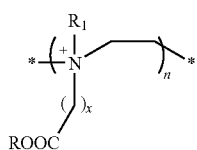

n>3
x=1-10
R=any alkyl chain, aromatic or lactate or glycolate.

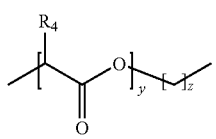

$R_4$=—H, —$CH_3$, —$C_2H_5$
y=1-10
z=0-22
or C(=O)R'

R'=any alkyl chain, aromatic group.

In another embodiment, the invention provides polymers having the following structure:

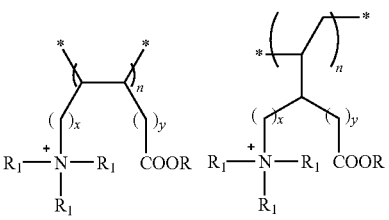

n>3
x=1-6
y=0-6
R=any alkyl chain, aromatic or lactate or glycolate)

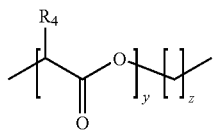

$R_4$=—H, —$CH_3$, —$C_2H_5$
y=1-10
z=0-22
or C(=O)R'
R'=any alkyl chain, aromatic group.

In another embodiment, the invention provides a polymer having the following structure:

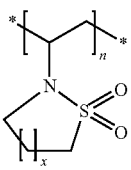

n>5
x=0-5.

In another embodiment, the invention provides a polymer having the following structure:

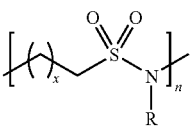

x=0-17
n>5
R=H or alkyl chain.

In another embodiment, the invention provides a polymer having the following structure:

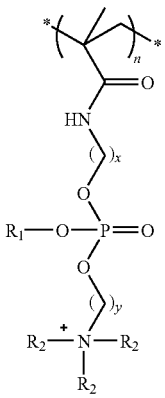

n>5
$R_2$=H or any alkyl chain, e.g., methyl
x, y=1-6
$R_1$=any alkyl chain,

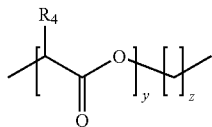

$R_4$=—H, —$CH_3$, —$C_2H_5$
y=1-10
z=0-22

In another embodiment, the invention provides a polymer having the following structure:

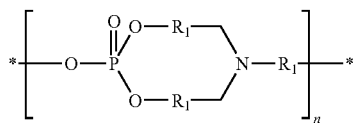

n>3
$R_1$=any alkyl chain.

Three representative cationic monomers of formula (III) useful for making cationic polymers of formula (I), and ultimately the zwitterionic polymers of formula (II) are illustrated in FIG. 1. Referring to FIG. 1, three positively charged polyacrylamides having pendant groups that bear cationic carboxybetaine ester groups are illustrated. The three monomers have different spacer groups ($L_2$: —$(CH_2)_n$—) between the quaternary ammonium groups (cationic center) and the ester (hydrolyzable) groups: CBAA-1-ester (n=1); CBAA-3-ester (n=3); and CBAA-5-ester (n=5). Polymerization of the monomers provides the corresponding cationic polymers. The three monomers were polymerized using free radical polymerization to form linear polymers, or using surface-initiated ATRP to prepare polymer brushes on SPR sensors. The polymers with different spacer groups ($L_2$) and ester groups were expected to have different chemical, physical and biological properties. The synthesis of the three monomers and their polymerizations are described in Example 1.

Figure 2:
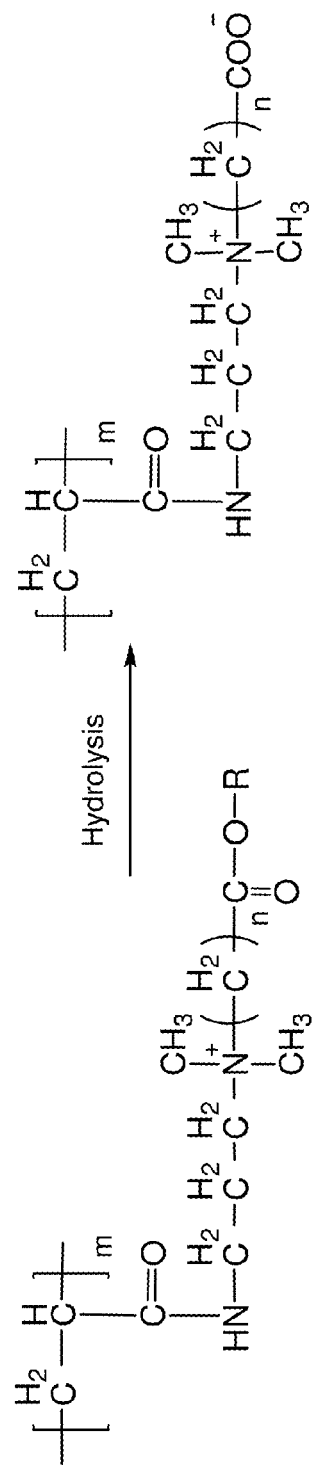
FIG. 2 illustrates the hydrolysis of a representative cationic polymer of the invention: hydrolysis of a cationic polycarboxybetaine ester to zwitterionic polycarboxybetaine.
Figure 3:
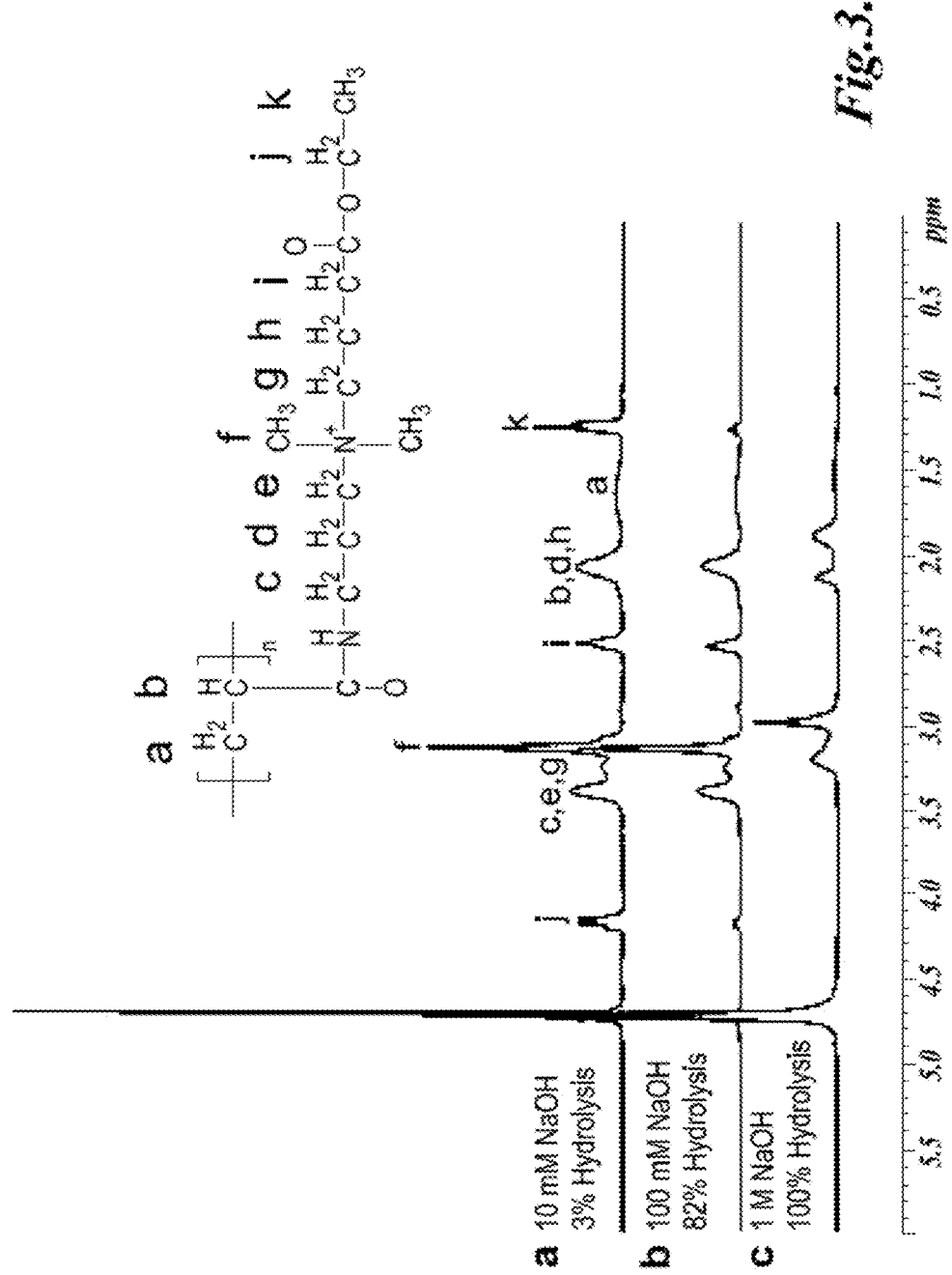
FIG. 3 compares the $^1$H NMR spectra of the hydrolysis of a representative cationic polymer of the invention, poly-CBAA-3-ester, after one-hour treatment in a solution with the sodium hydroxide concentration of (a) 10 mM (3% hydrolysis), (b) 100 mM (82% hydrolysis), and (c) 1 M (100% hydrolysis).
Figure 4:
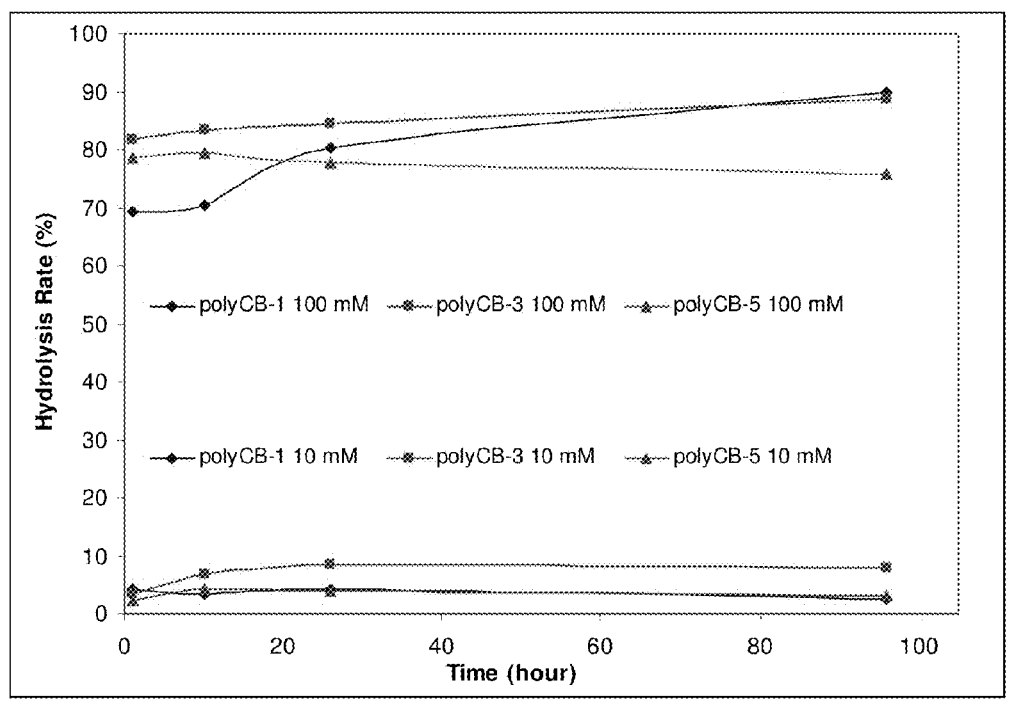
FIG. 4 compares the hydrolysis rates of representative cationic polymers useful in the invention at 10 mM and 100 mM aqueous sodium hydroxide.

For the linear polymers polymerized via free radical polymerization, their molecular weights were measured using gel permeation chromatography (GPC) in aqueous solutions. PolyCBAA-1-ester, polyCBAA-3-ester, and polyCBAA-5-ester had average molecular weights of 14 kDa, 13 kDa, and 9.6 kDa, respectively Hydrolysis of the cationic polymers provides the zwitterionic polymers (i.e., zwitterionic polycarboxybetaines). The hydrolysis of representative cationic polymer of the invention is described in Example 2 and illustrated schematically in FIG. 2. In FIG. 2, n is 1, 3, or 5 (corresponding to polyCBAA-1-ester, polyCBAA-3-ester, and polyCBAA-5-ester, respectively). The three carboxybetaine ester polymers were dissolved under different sodium hydroxide concentrations and their hydrolysis behavior was studied. After a period of time, the hydrolysis rate of the polymers was analyzed by measuring the retaining ester groups on the polymer using $^1$H NMR. All the three polymers are stable in water and no evident hydrolysis was detected after four days. The concentration of NaOH is crucial for the hydrolysis of the carboxybetaine ester polymers. FIG. 3 illustrates the NMR spectra of polyCBAA-3-ester after a one-hour treatment with three different concentrations of NaOH. For NaOH solution with a concentration of 10 mM, only slightly hydrolysis was detected (ca. 3%). For 100 mM NaOH solution, about 82% polymer was hydrolyzed. For the NaOH concentration of 1 M, the polymer was totally hydrolyzed in one hour. FIG. 4 graphs the hydrolysis rate under 100 mM or 10 mM NaOH as a function of time. Referring to FIG. 4, under these two NaOH concentrations, most hydrolysis happens in the first hour. After that, the hydrolysis rate changes only slightly with the time.

As noted above, the hydrolysis rate of the cationic polymers useful in the invention can be controlled by modifying their structures. To obtain the different hydrolysis behavior, cationic polymers having varying structure parameters such as ester groups (hydrolyzable groups), spacer groups ($L_1$ and $L_2$), and counter ions ($X^-$). Hydrolysis behavior can also be controlled by varying polymer molecular weight or copolymerizing with other monomers. Hydrolyzable ester groups (such as t-butyl and alkyl substituted silyl) or anhydride groups can be easily hydrolyzed under acidic or basic condition. Changing spacer groups ($L_2$: —$(CH_2)_n$—) between the quaternary ammonium groups (cationic center) and the ester (hydrolyzable) groups also can tune the hydrolysis rate. Short spacers can increase the hydrolysis rate. In addition, counter ions, such as hydrophilic anions (e.g., $Cl^-$, $Br^-$, $I^-$, $SO_4^-$) also increase the hydrolysis rate, and low polymer molecular weight and copolymerization with other hydrophilic monomers also help to increase the hydrolysis rate.

Protein Adsorption

The hydrolyzable cationic polymers useful in the invention can advantageously be used as materials effective in reducing protein adsorption to surfaces treated with the polymers. The cationic polymers can be used to prepare low-fouling surfaces. These surfaces can be advantageously employed for devices in environments where the protein adsorption to device surfaces are detrimental.

To demonstrate the utility of representative cationic polymers useful in the invention in providing surfaces having low protein adsorption, polymer brushes were prepared from representative cationic polymers as described in Example 3 and their protein adsorption measured.

The three monomers (CBAA-1-ester, CBAA-3-ester, and CBAA-5-ester) were grafted on the surfaces of a SPR sensor using surface-initiated ATRP. The polymer brushes had a thickness of 5-20 nm estimated from XPS analysis. Protein adsorption from a 1 mg/mL fibrinogen solution on the three polymer brushes was measured using SPR. Fibrinogen is a sticky protein and plays an important role in platelet aggregation and blood clotting on biomaterials. Fibrinogen adsorption was 195 ng/cm$^2$, 255 ng/cm$^2$, and 600 ng/cm$^2$ for poly-CBAA-1-ester, polyCBAA-3-ester, and polyCBAA-5-ester, respectively (see FIGS. 5A-5C). All three polymers have evident protein adsorption due to their positive charges. Poly-CBAA-1-ester had relatively lower fibrinogen adsorption due to its higher hydrophilicity compared to the other two esters having more hydrophobic $L_2$ (i.e., C3 and C5, respectively). With the increase in $L_2$ from methylene to propylene to pentylene, the hydrophobicity of the polymer increases, leading to higher fibrinogen adsorption.

Figure 5A:
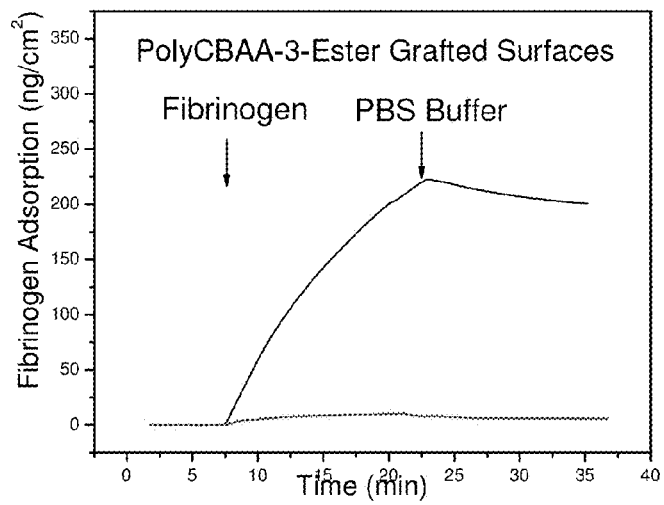
FIGS. 5A-5C are SPR sensorgrams for fibrinogen adsorption on the surfaces grafted with representative polymers useful in the invention: polycarboxybetaine esters before and after hydrolysis; (a) polyCBAA-1-ester, (b) polyCBAA-3-ester, and (c) polyCBAA-5-ester. The surfaces with polymer brushes were hydrolyzed with a 100 mm NaOH solution for 1-2 h.
Figure 5B:
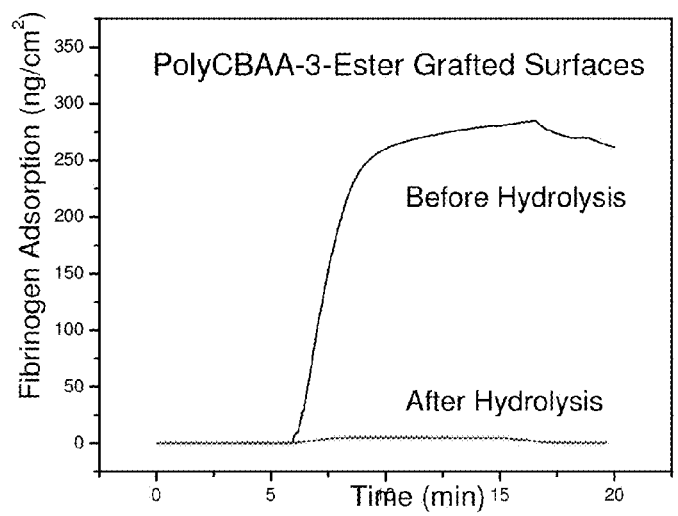
Figure 5C:
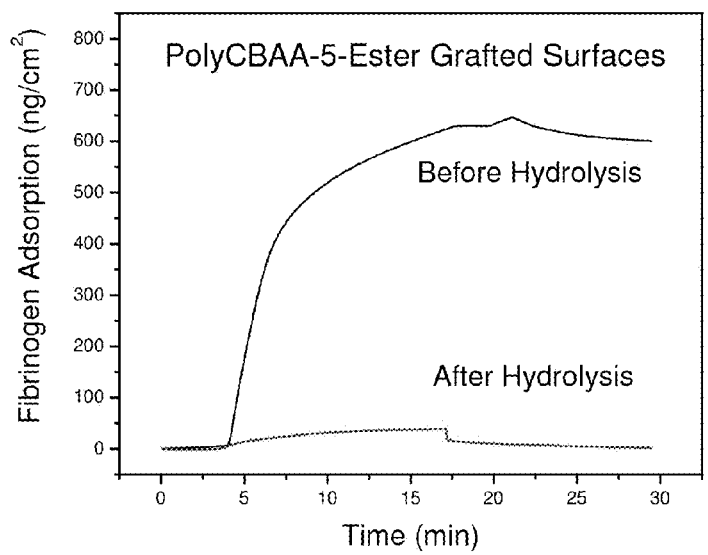

After hydrolysis at 100 mM for 1-2 hours, surface properties were dramatically changed. FIGS. 5A-5C illustrate that the surfaces grafted with each of the three polymers were converted to surfaces that were highly resistant to fibrinogen adsorption. On the surfaces with hydrolyzed polyCBAA-1-ester and hydrolyzed polyCBAA-3-ester, fibrinogen adsorption is less than 0.3 ng/cm$^2$, which is the detection limit of the SPR. Fibrinogen adsorption on hydrolyzed polyCBAA-5-ester was about 1.5 ng/cm$^2$. By controlling hydrolysis, the polymer-grafted surfaces can change their properties from high protein adsorption to strongly resistant to protein adsorption. Moreover, resulting surfaces with zwitterionic polymers after hydrolysis are biocompatible and highly resistant to nonspecific protein adsorption from blood plasma/serum and bacterial adhesion/biofilm formation.

Antimicrobial Properties

The hydrolyzable cationic polymers useful in the invention exhibit antimicrobial properties. The evaluation of antimicrobial properties of representative cationic polymers useful in the invention is described in Example 4.

To evaluate the antimicrobial properties of the cationic polycarboxybetaine esters, polymer solutions of polyCBAA-1-ester, polyCBAA-3-ester, and polyCBAA-5-ester were incubated with *E. coli*. It was found that at a concentration of 2 mM (repeat unit molar concentration), polyCBAA-1-ester, polyCBAA-3-ester, and polyCBAA-5-ester present a live cell percentage of 95%, 87.3%, and 46.2%, respectively (see FIG. 6). Antimicrobial activities appears to increase with the increase in the length of $L_2$. After hydrolysis, the zwitterionic polymers, polyCBAA-1, polyCBAA-3, and polyCBAA-5, exhibit a live cell percentage of 93.7%, 96.3% and 95.3%, respectively, indicating that the antimicrobial activity decreases with the hydrolysis of the cationic polymers (i.e., polycarboxybetaine esters) to the zwitterionic polymers (i.e., polycarboxybetaines).

Several amphiphilic polycations have been investigated for their antibacterial activities. The alkyl pendent chain length of the polycations was studied to compare the bactericidal efficiency of different polycations. It is found that the polymers with quaternary amine groups and longer hydrophobic pendant chains have better antimicrobial activities due to higher hydrophobicity. Small molecular quaternary ammonium compounds (QMCs) with carboxybetaine esters were found to have rapid bactericidal action when they have longer hydrocarbon groups. These QMCs could bind to the outer membrane and cytoplasmic membrane of enterobacteria and permeate into the bacterial membranes. The antimicrobial effect is increased with increasing the spacer length ($L_2$) of the cationic polymers (e.g., polycarboxybetaine esters) of the invention.

The antimicrobial efficacy of the polyCBAA-5-ester is comparable to that of other quaternized polymers with similar alkyl chain length. Higher antimicrobial efficacy can be achieved with longer alkyl chain lengths (e.g., C1-C20).

For conventional antimicrobial coatings, the killed microbes and adsorbed proteins usually accumulate on the surfaces and dramatically decrease their antimicrobial activities. In contrast, antimicrobial coatings made from the cationic polymers useful in the invention are hydrolyzed to zwitterionic polymers to provide surfaces that are highly resistant to the adsorption of various biomolecules. These zwitterionic polymers are nontoxic, biocompatible, and nonfouling, both as bulk materials and surface coatings.

Representative crosslinked zwitterionic polymers useful in the invention, polycarboxybetaines hydrogels, were non-cytotoxic and contain less than 0.06 units (EU)/mL of endotoxin using a Limulus Amebocyte Lysate (LAL) endotoxin assay kit (Cambrex Bioscience. Walkerville, Md.). The polycarboxybetaine hydrogels were implanted subcutaneously within mice for up to four weeks. The results showed that the polycarboxybetaines have in vivo biocompatibility comparable to that of poly(2-hydroxyethyl methacrylate (poly-HEMA) hydrogels, a well-accepted model biomaterial for implantation. The nontoxic properties of the zwitterionic polymers convert the toxicity of their cationic polymer precursors and further provide nonfouling properties that can prevent dead microbes and adsorbed proteins from accumulating on the surface.

Switchable Polymer Coatings and their Use in Marine Coatings

The cationic polymers useful in the invention, hydrolyzable to zwitterionic polymers, can be advantageously used as coatings for the surfaces of a variety of devices including, for example, marine coatings. In this embodiment, the cationic polymers useful in the invention provide switchable biocompatible polymer surfaces having self-polishing and nonfouling capabilities.

Figure 7:
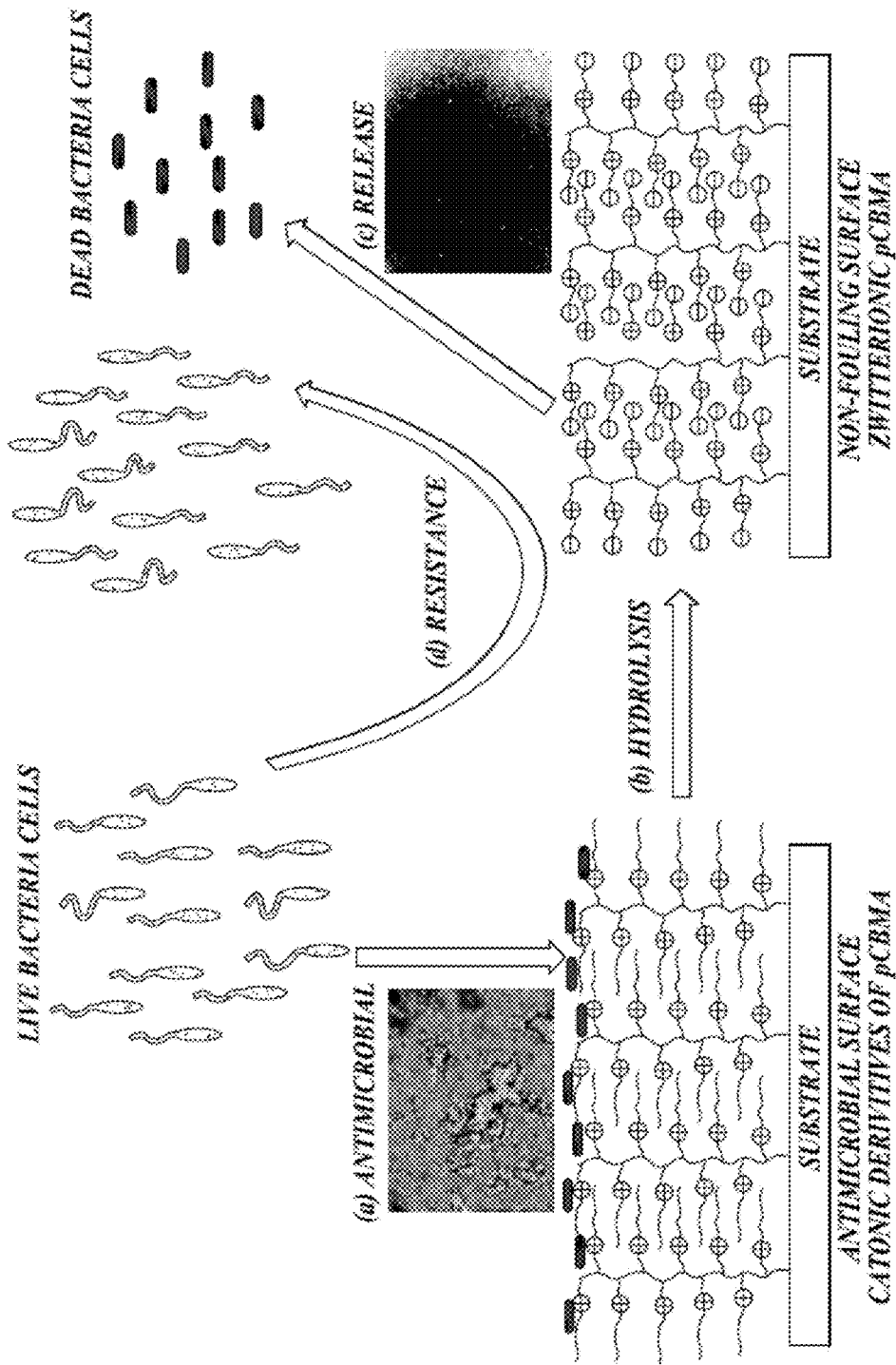
FIG. 7 is a schematic illustration of a representative surface of the invention coated with a cationic polymer. The surface switches from an antibacterial surface to a non-fouling surface upon hydrolysis: (a) antimicrobial cationic pCBMA-1 C2 effectively kills bacteria, (b) pCBMA-1 C2 is converted to non-fouling zwitterionic pCBMA-1 upon hydrolysis, (c) killed bacteria remaining on the surface is released from non-fouling zwitterionic pCBMA-1 demonstrating that (d) zwitterionic pCBMA-1 itself is highly resistant to bacterial adhesion.
Figure 8:
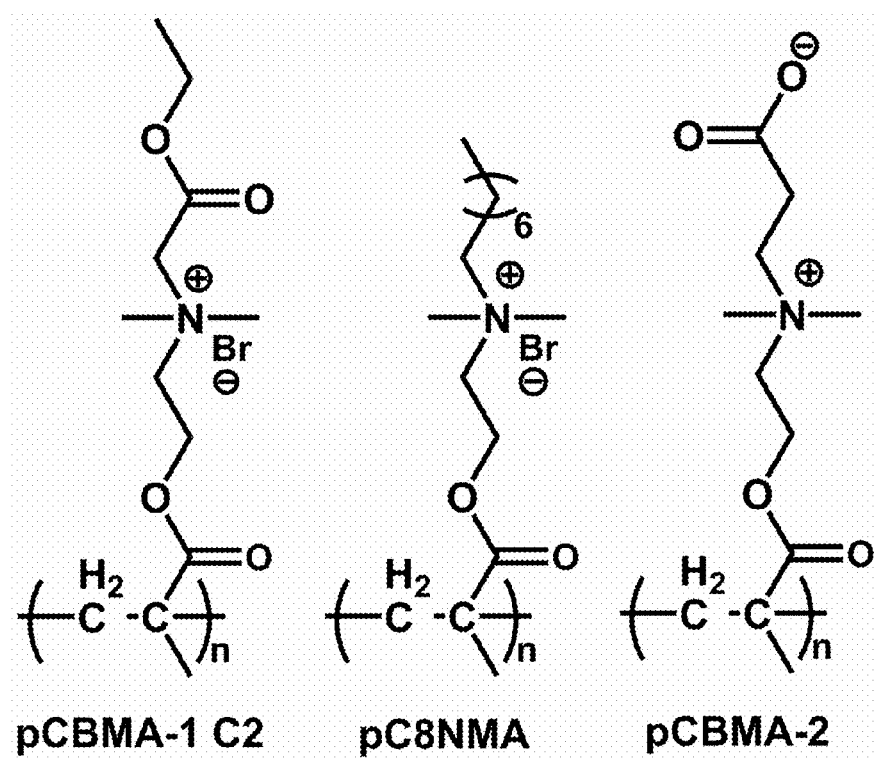
FIG. 8 illustrates the chemical structures of a representative cationic polymer of the invention, switchable pCBMA-1 C2; antimicrobial cationic pC8NMA; and non-fouling zwitterionic pCBMA-2.

FIG. 7 is a schematic illustration of a switchable biocompatible polymer surfaces having self-polishing and nonfouling capabilities. Referring to FIG. 7, antimicrobial surface (a) is a surface coated with a representative cationic polymer of the invention (i.e., pCBMA-1 C2, see FIG. 8) that effectively kills bacteria. On hydrolysis (b) the representative cationic polymer is converted to a nonfouling zwitterionic polymer (i.e., pCBMA-1, the carboxylate corresponding to pCBMA-1 C2 ester) and dead bacteria remaining on the surface are released (c) from the nonfouling zwitterionic polymer (i.e., pCBMA-1) to provide a surface coated with the zwitterionic polymer, which is highly resistant to bacterial adhesion (d).

The materials noted above are advantageously used to coat marine surfaces to provide biocompatible, antimicrobial, and nonfouling surfaces. Accordingly, in another aspect, the invention provides marine devices and materials having a surface (i.e., one or more surfaces) to which have been applied (e.g., coated, covalently coupled, ionically associated, hydrophobically associated) one or more materials noted above. Representative marine devices that may be advantageously treated with the material, modified to include the material, or that incorporates the material include marine vessels (e.g., boat or ship hulls).

As noted above, in one embodiment, the present invention provides a switchable polymer surface coating that combines the advantages of both nonfouling surface and that can kill greater than 99.9% of *Escherichia coli* K12 in one hour, with 98% of the dead bacterial cells released when the cationic derivatives are hydrolyzed to nonfouling zwitterionic polymers. pCBMA-1-C2 (cationic polymer of formula (I) where $L_1$ is $—C(=O)OCH_2CH_2—$, $L_2$ is $—CH_2—$, $R_c$ is $CH_2CH_3$, and $X^-$ is $Br^-$) control coatings were grafted by surface-initiated atom transfer radical polymerization (ATRP) onto a gold surface covered with initiators. The thicknesses of the obtained polymer coatings, as measured by atomic force microscopy (AFM), were 26-32 nm (Table 1).

TABLE 1

Film thicknesses (av ± std dev.) of pCBMA-1 C2, pC8NMA, and pCBMA-2 grafted onto gold-coated glass slides by ATRP and fibrinogen adsorption on these surfaces measured by SPR before and after hydrolysis under different conditions.

|  | pCBMA-1 C1 | pC8NMA | pCBMA-2 |
|---|---|---|---|
| polymer brush thickness (nm) | (31.2 ± 2.4) | (27.8 ± 2.8) | (26.1 ± 2.5) |
| protein adsorption (ng cm$^{-2}$) |  |  |  |
| 0 h | 229.2 | 243.4 | 1.5 |
| 24 h H$_2$O | 189.9 | — | — |
| 24 h CHES (pH 9.0) | 114.9 | — | — |
| 24 h CAPS (pH 10.0) | 0 | 285.1 | 0.7 |

Figure 9:
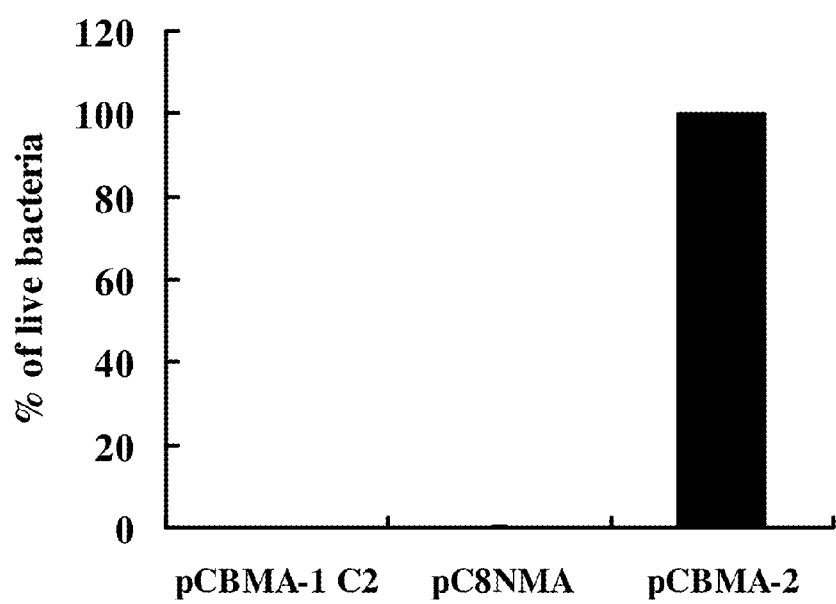
FIG. 9 is a graph comparing bactericidal activity of pCBMA-1 C2 and pC8NMA against $E.\ coli$ K12. The percentage of live $E.\ coli$ K12 colonies that grew on the surfaces coated with antimicrobial polymers is relative to the number of colonies that grew on the pCBMA-2 control (n=3).
Figures 10A, 10B, 10C, 10D, 10E, 10F:
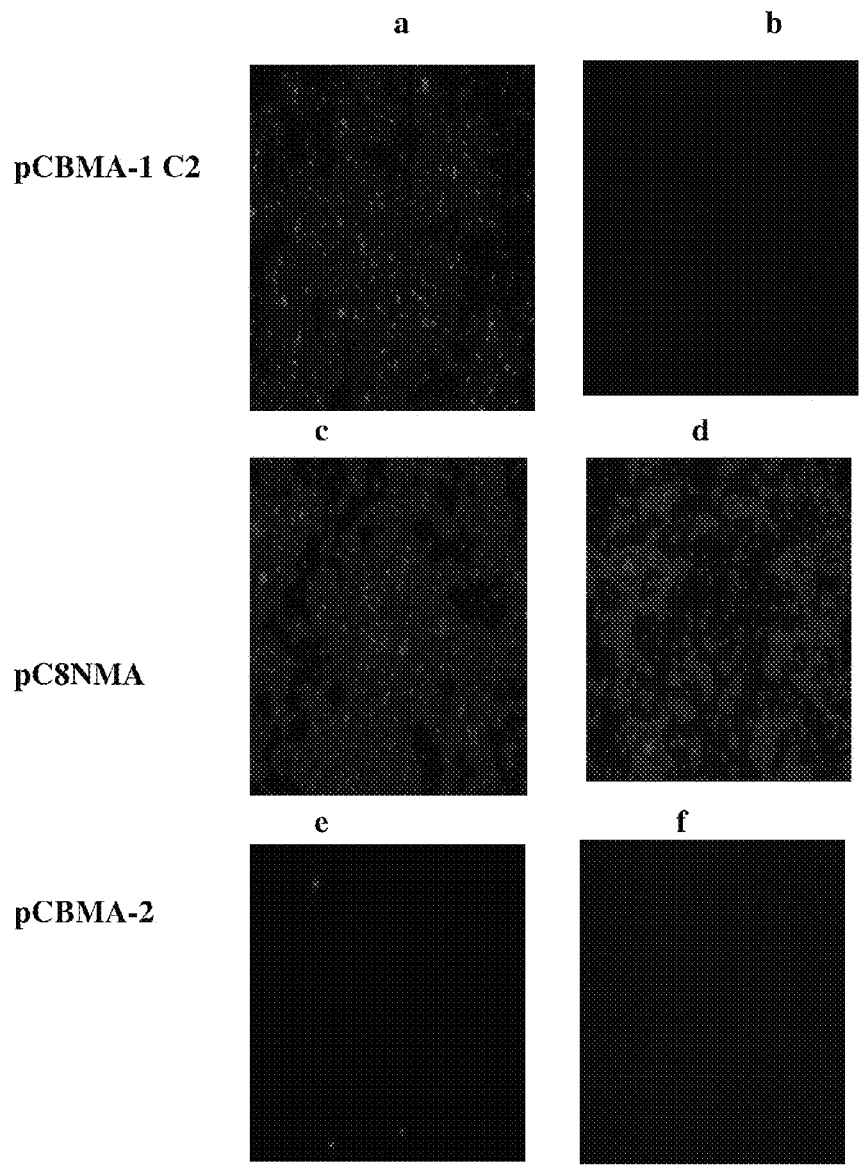
FIGS. 10A-10F are fluorescence microscopy images of attached $E.\ coli$ K12 cells (red color) from a suspension with $10^{10}$ cells $mL^{-1}$ for one-hour exposure to the surfaces covered with various polymers: (a), (c), and (e) are for pCBMA-1 C2, pC8NMA and pCBMA-2, respectively, before hydrolysis and (b), (d), and (f) are for the same polymers, respectively, after hydrolysis. Hydrolysis was for 8 days with 10 mM CAPS (pH 10.0).

The bactericidal activity of pCBMA-1 C2 surfaces was determined using *E. coli* K12, according to a modified literature procedure (Tiller et al., *Proc. Natl. Acad. Sci. USA* 98:5981, 2001). The permanently cationic poly(methacryloyloxyethyl-dimethyloctylammonium bromide) (pC8NMA, cationic control, (see FIG. 8) and the zwitterionic poly(2-carboxy-N,N-dimethyl-N-[2'-(methacryloyloxy)ethyl]ethanaminium) (pCBMA-2, zwitterionic control, see FIG. 8) were used as the positive and the negative control surfaces, respectively. The antimicrobial efficiency was defined as the amount of live cells on the tested surfaces relative to those on the pCBMA-2 surface. FIG. 9 shows that pCBMA-1 C2 and pC8NMA surfaces kill greater than 99.9% and 99.6%, respectively, of the *E. coli* in one hour relative to pCBMA-2 surfaces. The total number of live bacterial cells on the gold surface, which was also used as a negative-control surface, is similar to that on the pCBMA-2 surface.

Figure 11:
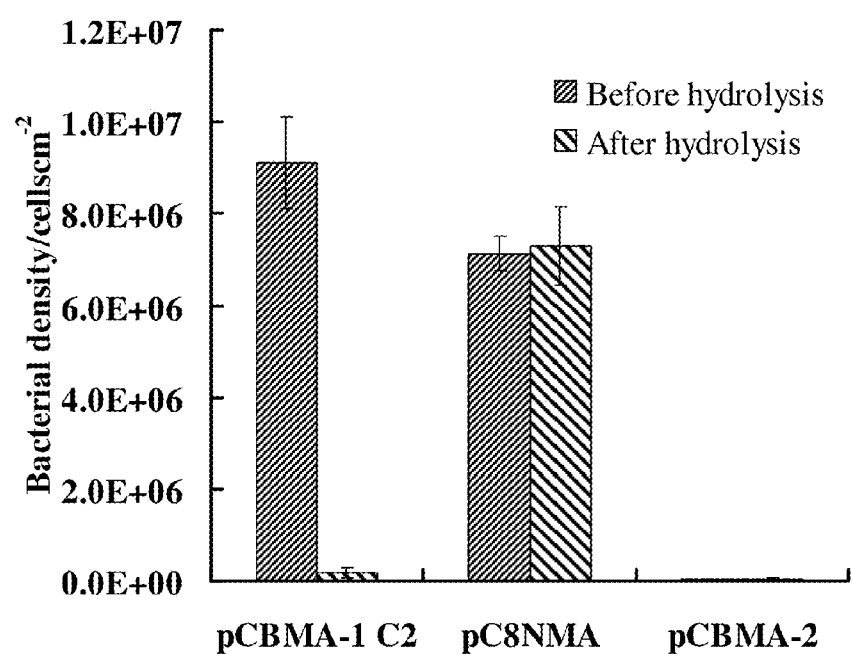
FIG. 11 is a graph comparing the attachment of $E.\ coli$ K12 from a suspension with $10^{10}$ cells $mL^{-1}$ for one-hour exposure to pCBMA-1 C2, pC8NMA, and pCBMA-2 before and after hydrolysis (n=3).

The attachment and release of *E. coli* K12 were tested on the pCBMA-1 C2 surfaces before and after hydrolysis. Cationic pC8NMA and zwitterionic pCBMA-2 were used as the negative and the positive nonfouling control surfaces, respectively, and as the positive and the negative antimicrobial control surfaces, respectively. FIGS. 10A-10F show that large amounts of bacteria were attached to the cationic pCBMA-1 C2 and pC8NMA surfaces before hydrolysis, whereas very few bacterial cells were attached to the zwitterionic pCBMA-2 surface. In contrast to pC8NMA, pCBMA-1 C2 released the majority of cells after hydrolysis while pCBMA-2 remained nonfouling. FIG. 11 shows quantitative data for the amount of bacterial cells remaining on all three polymer surfaces before and after hydrolysis. There were similar amounts of bacterial residues on both cationic pCBMA-1 C2 and pC8NMA surfaces before hydrolysis, while the amount of attached cells on the pCBMA-2 surface is less than 0.3% of that on both cationic pCBMA-1 C2 and pC8NMA surfaces. To test the release of bacterial residues, the three surfaces were incubated in N-cyclohexyl-3-aminopropanesulfonic acid (CAPS) buffer (10 mM, pH 10.0) at 37° C. for 8 days. The pCBMA-1 C2 surfaces were hydrolyzed to poly(N-(carboxymethyl)-N,N-dimethyl-2-[(2-methyl-1-oxo-2-propen-1-yl)-oxy]ethanaminium) (pCBMA-1) and 98% of the dead bacterial cells were released. In contrast, no release of the dead cells was observed on pC8NMA surfaces (p>0.1) while pCBMA-2 surfaces retained very low bacterial adhesion.

The release of the attached bacterial cells is dependent on the conversion of cationic pCBMA-1 C2 into zwitterionic pCBMA-1. Hydrolysis rate of betaine esters is influenced by several factors, such as the length of the spacer (L$_2$) between the quaternary amine and the carboxyl groups, the nature of the hydrolyzable group, temperature,[1] and pH value. The majority of polymer chains of the ester group used were hydrolyzed. The hydrolysis rate of the betaine esters is also slower after bacterial cells and proteins are attached to the surface. pCBMA-1 C2, which has one methylene spacer (L$_2$), was chosen and the experimental temperature was set at 37° C. to achieve a fast hydrolysis rate and to provide a physiologically relevant temperature. The protein adsorption results (see Table 2) showed that the clean, cationic pCBMA-1 C2 surface was hydrolyzed into a nonfouling zwitterionic surface after only 24 h at 37° C. and pH 10.0, while it took 48 h to form a nonfouling surface and release bacterial residues after the attachment of bacteria from an *E. coli* K12 suspension of 10$^7$ cells mL$^{-1}$. When bacterial cells were attached to the pCBMA-1 C2 surface from a suspension of 10$^{10}$ cells mL$^{-1}$, the release of attached bacteria took eight days under the same hydrolysis conditions.

Figure 12A:
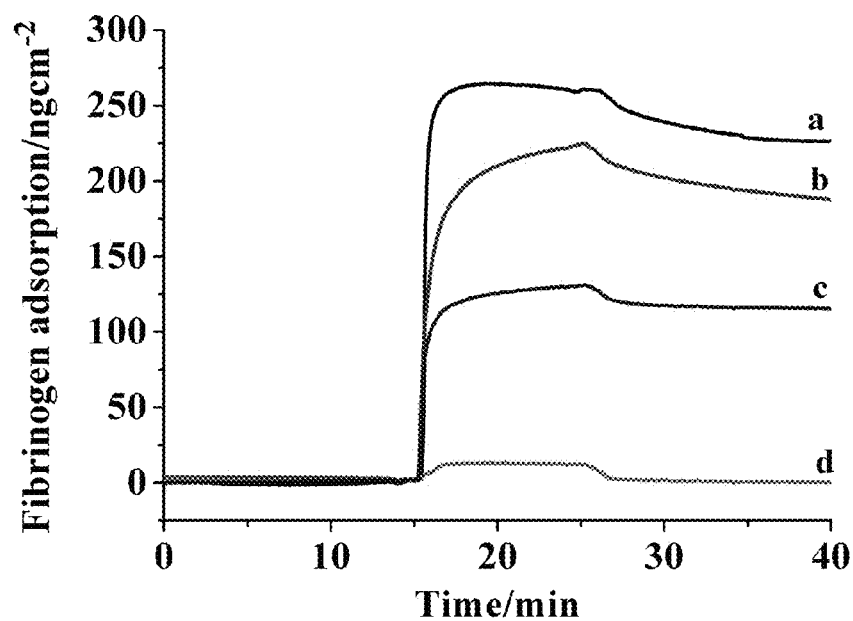
FIG. 12A compares SPR sensorgrams showing the adsorption of 1 mg $mL^{-1}$ fibrinogen in PBS buffer on the surfaces grafted with pCBMA-1 C2 via ATRP (a) before hydrolysis, and (b), (c) and (d) after 24 hr hydrolysis with water, 10 mM CEHS at pH 9.0, and 10 mM CAPS at pH 10.0, respectively.
Figure 12B:
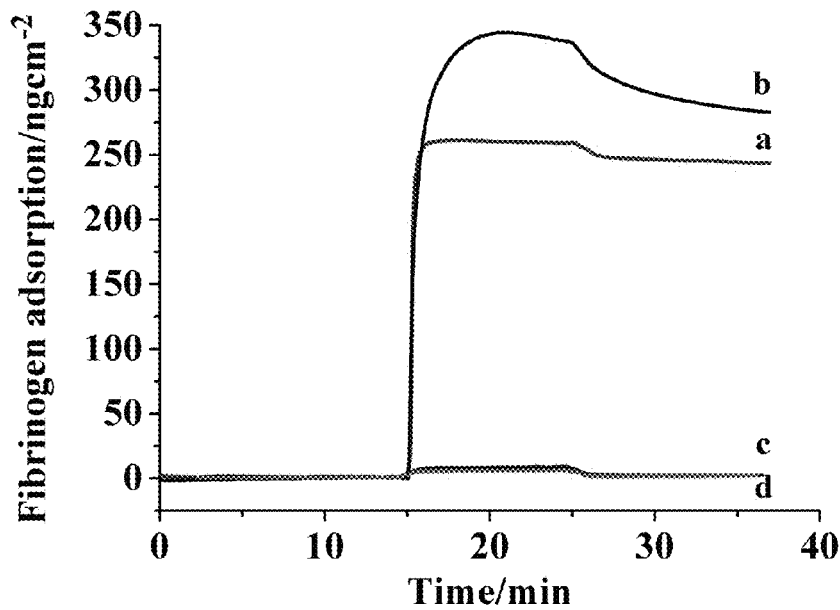
FIG. 12B compares SPR sensorgrams showing the adsorption of 1 mgmL$^{-1}$ fibrinogen in PBS buffer on the surfaces grafted with pC8NMA (a) before and (b) after 24 hr incubation with 10 mM CAPS at pH 10.0, and on the surfaces grafted with pCBMA-2 (c) before hydrolysis and (d) after 24 h of hydrolysis with 10 mM CAPS at pH 10.0.

Nonspecific protein adsorption on various surfaces was measured by a surface plasmon resonance (SPR) sensor to determine the nonfouling characteristics of the surfaces (see Table 2). Hydrolysis conditions for pCBMA-1 C2 and control surfaces were investigated in situ in the SPR sensor. FIGS. 12A and 12B show representative SPR sensorgrams for fibrinogen adsorption on pCBMA-1 C2 and control surfaces over time. The fibrinogen adsorption on pCBMA-1 C2 before hydrolysis was 229.2 ng cm$^{-2}$. After 24 h of incubation with CAPS buffer (pH 10.0), there was no measurable protein adsorption on the pCBMA-1 C2 surface, which indicated that pCBMA-1 C2 was completely hydrolyzed to nonfouling zwitterionic pCBMA-1. In contrast, hydrolysis of pCBMA-1 C2 was not complete after 24 h incubation in either water or N-cyclohexyl-2-aminoethanesulfonic acid (CEHS) buffer (pH 9.0). As shown in FIG. 12B, high fibrinogen adsorption was observed on the pC8NMA surface before and after the surface was incubated with CAPS buffer (pH 10.0) for 24 h at 37° C. However, under identical conditions, the pCBMA-2 surface still exhibited excellent nonfouling properties, with less than 2 ng cm$^{-2}$ fibrinogen absorption. This result indicates that the obtained zwitterionic surfaces are highly resistant to protein adsorption and are qualified as ultralow fouling surfaces.

In this embodiment, the invention provides a switchable polymer surface that integrates antimicrobial and nonfouling properties and is biocompatible. The representative cationic polymer (i.e., precursor of pCBMA) is able to kill bacterial cells effectively and switches to a zwitterionic nonfouling surface and releases dead bacterial cells upon hydrolysis. Moreover, the resulting nonfouling zwitterionic surface can further prevent the attachment of proteins and microorganisms and reduce the formation of a biofilm on the surface. The switchable process from antimicrobial to nonfouling surfaces can be tuned through adjusting the hydrolysis rate of these polymers for specific requirements of applications.

Figure 13:
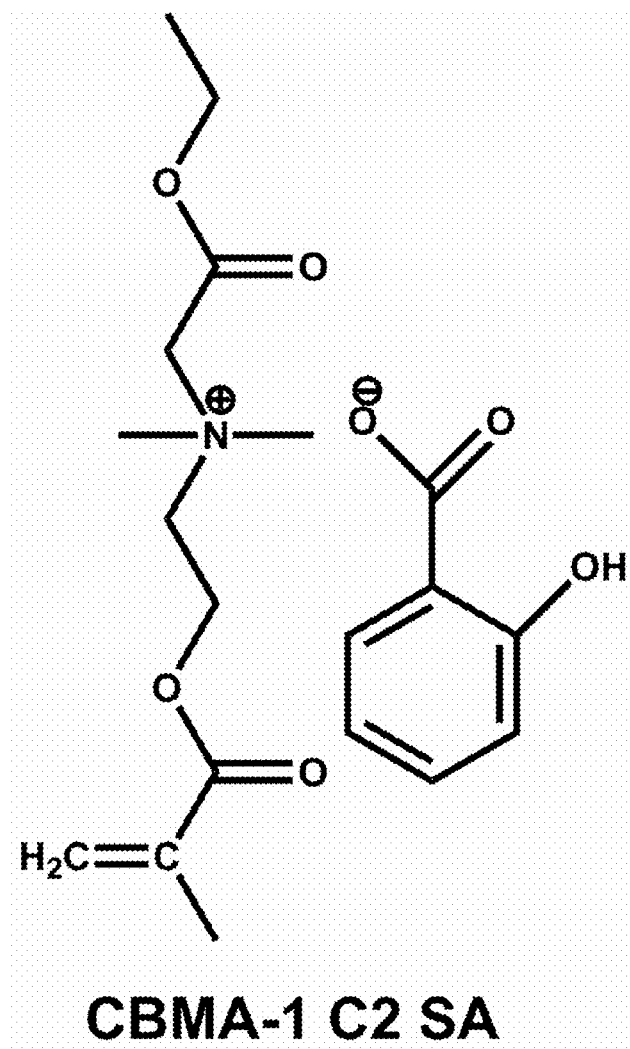
FIG. 13 illustrates the structure of a representative cationic monomers useful for making cationic polymers useful in the invention: CBMA-1 C2 SA, the ethyl ester of CBMA-1 having a salicylate counter ion.
Figure 14:
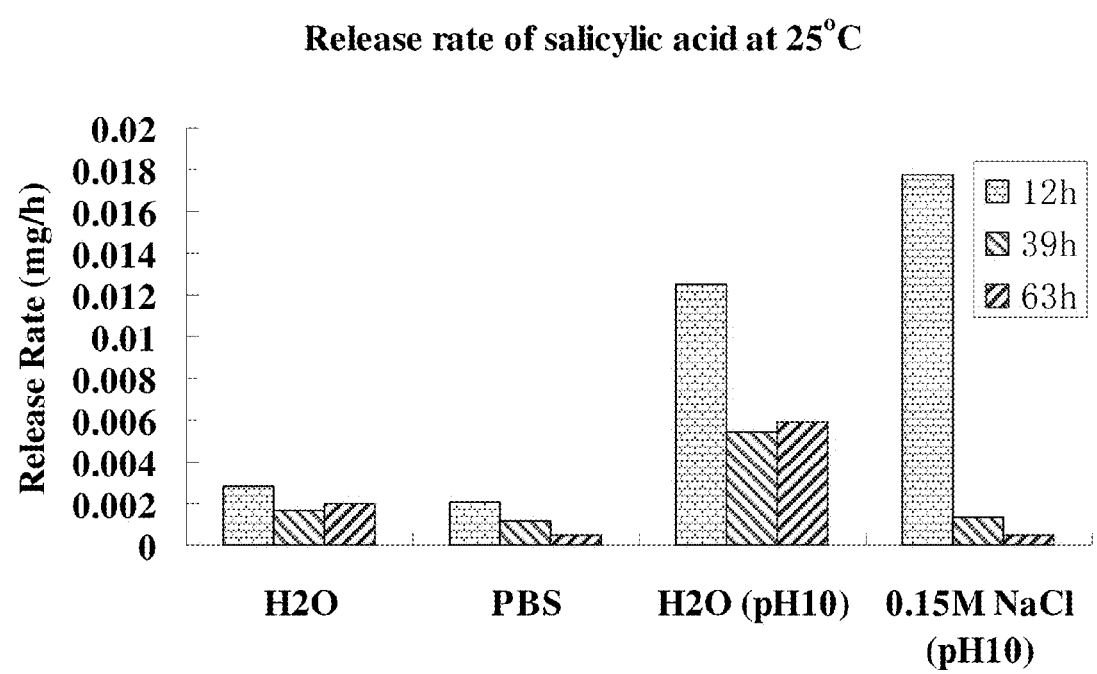
FIG. 14 compares the release rate (mg/h) of salicylic acid over time (12 h, 39 h, and 63 h) at 25° C. under four conditions from hydrogels prepared by polymerizing CBMA-1 C2 SA: (a) water, neutral pH; (b) phosphate buffered saline (PBS); (c) water, pH 10; and (d) 0.15 M aqueous sodium chloride, pH 10.
Figure 15:
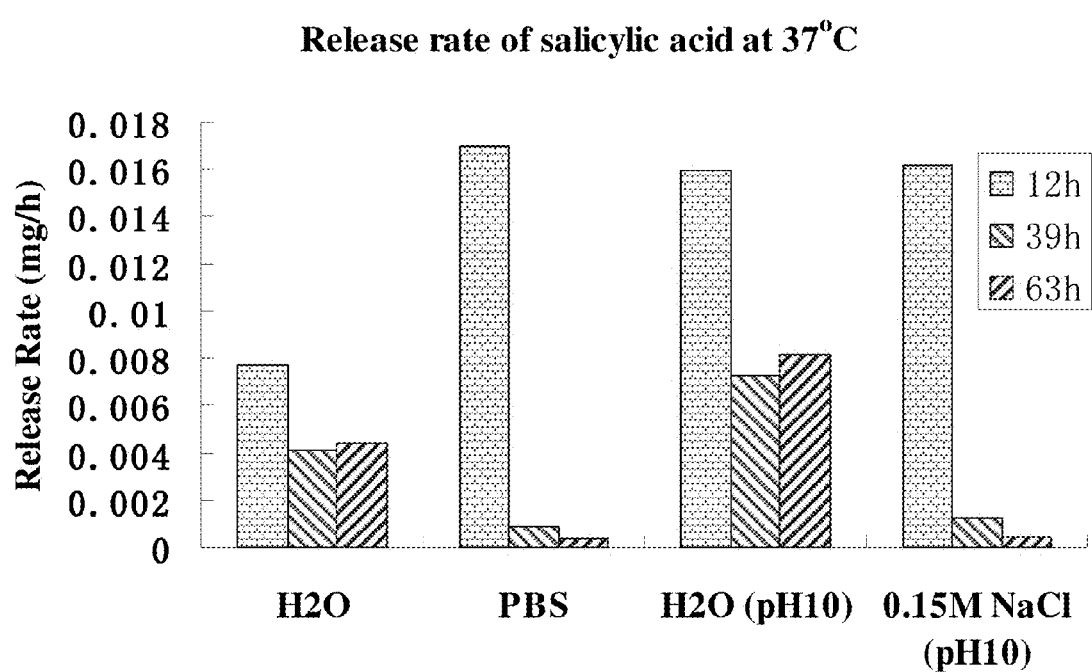
FIG. 15 compares the release rate (mg/h) of salicylic acid over time (12 h, 39 h, and 63 h) at 37° C. under four conditions from hydrogels prepared by polymerizing CBMA-1 C2 SA: (a) water, neutral pH; (b) phosphate buffered saline (PBS); (c) water, pH 10; and (d) 0.15 M aqueous sodium chloride, pH 10.

As noted above, the cationic polymers useful in the invention can include a hydrophobic counter ion or a counter ion having therapeutic activity (e.g., antimicrobial or antibacterial activity). A representative polymer having a salicylate counter ion (polyCBMA-1 C2) can be prepared from the monomer illustrated in FIG. 13: CBMA-1 C2 ("1" indicates one carbon between two charged groups and "C2" indicates C2 ester). PolyCBMA-1 C2 hydrogel loaded with salicylic acid (SA) as its counter ion was prepared by copolymerizing 1 mM CBMA-1 C2 SA monomer (FIG. 13) with 0.05 mM tetraethylenglycoldimethacrylate in 1 ml of solvent (ethylene glycol:water:ethanol=1:2:1) at 65° C. for 2 hours. The resulting hydrogel was soaked in DI water for 12 hours. The hydrogel was cut into round disks with 1 cm diameter. The hydrogel disks were then transferred into solutions with different pH and ionic strength and incubated at 25° C. or 37° C. At different time points the aqueous phase was completely removed and new solutions were added. The release of SA into the aqueous phase was measured by high performance liquid chromatography (HPLC). The release rate of SA is defined as the amount of released SA divided by time (mg/h). The release rate of SA from pCBMA-1 C2 SA hydrogel depends on temperature, ionic strength, and pH. FIG. 14 and FIG. 15 indicated that higher pH promotes the release of SA and that increased ionic strength can slightly increase the release rate of SA. By comparing FIG. 14 and FIG. 15, it can be observed that the elevated temperature results in a faster release of SA in water and phosphate buffered saline (PBS). The release rate of SA decreases as a function of time for all the conditions.

The cationic polymers useful in the invention, hydrolyzable to zwitterionic polymers, can be advantageously used as coatings or components of coatings for the surfaces of a variety of marine devices including, for example, boat and ship hulls. In this embodiment, the cationic polymers useful in the invention provide switchable biocompatible polymer surfaces having self-sterilizing and nonfouling capabilities. The cationic polymers applied as marine coatings convert to hydrophilic nonfouling coatings (zwitterionic coatings) on contact with seawater.

FIG. 7 is a schematic illustration of a switchable biocompatible polymer surfaces having self-sterilizing and nonfouling capabilities. Referring to FIG. 7, antimicrobial surface (a) is a surface coated with a representative cationic polymer of the invention (i.e., pCBMA-1 C2, see FIG. 8). On hydrolysis (b) the representative cationic polymer is converted to a nonfouling zwitterionic polymer (i.e., pCBMA-1, the carboxylate corresponding to pCBMA-1 C2 ester) to provide a surface coated with the zwitterionic polymer, which is highly resistant to bacterial adhesion (d).

In marine coating applications, the functional leaving/hydrolysable groups or functional counter ions are particularly useful. In these embodiment, the leaving/hydrolysable groups and/or counter ions are advantageously antimicrobial or biocide agents. The marine coating compositions of the invention are effective to store and release biocides.

The present invention provides nonfouling marine coatings for long-term applications. These durable, nonfouling marine coatings are self-polished at the outermost layer upon contact with seawater. The coating can be combined with fouling-release or anti-fouling technologies.

In one embodiment, the marine coating includes cationic polymers useful in the invention having a hydrophobic ion for counter ion X$^-$. In this embodiment, the nonfouling marine coatings include one or more of the following polymers: (1) cationic homopolymers (i.e., polymers prepared by polymerization of hydrolysable precursors of zwitterionic monomers); (2) copolymers prepared by copolymerization of the cationic monomers of the invention (i.e., hydrolysable precursors of zwitterionic monomers) and zwitterionic or hydrophobic monomers; and (3) copolymers prepared by polymerization of hydrolysable precursors of mixed charged monomers.

Representative cationic homopolymers include the cationic polymers useful in the invention described above as well as the cationic homopolymers of formulas (IV) and (V) below.

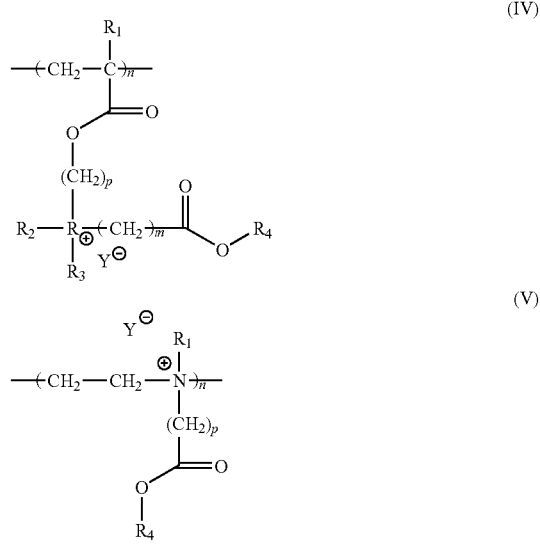

The cationic polymers of formula (IV) have the cationic center in the pendant group attached to the polymer backbone. The cationic polymers of formula (V) have the cationic center in the polymer backbone.

For the polymers of formulas (V) and (VI), $R_1$ is selected from hydrogen, methyl, and ethyl; $R_2$ and $R_3$ are independently selected from C1-C20 alkyl and fluoroalkyl; $R_4$ is selected from C1-C20 alkyl, C6-C12 aryl, tri(C1-C8 alkyl) silyl, alkyl copper, and alkyl zinc; m is an integer from 1 to 10; p is an integer from 1 to 10; R is a cationic center selected from ammonium, imidazolium, triazaolium, pyridinium, morpholinium, oxazolidinium, pyrazinium, pyridazinium, pyrimidinium, piperazinium, and pyrrolidinium, and other nitrogen bases; Y is chloride, bromide, iodide, sulfate, nitrate, perchlorate ($ClO_4$), tetrafluoroborate ($BF_4$), hexafluorophosphate ($PF_6$), bis(trifluoromethylsulfonyl)amide($N[SO_2CF_3]_2$), trifluoromethylsulfonate ($SO_3CF_3$), C1-C20 carboxylate (R—C(=O)O$^-$), C1-C20 sulfonate (R—SO$_3^-$), lactate, salicylate, and derivatives thereof; and n is 5 to about 100,000.

The preparation of representative cationic homopolymers useful in the invention having formula (IV) having a hydrophobic counter ion and their self-polishing and nonfouling properties are described in Example 5. The water solubilities of representative cationic polymers useful in the invention having formula (IV) is summarized in Table 2.

TABLE 2

| Water Solubility of Representative Cationic Polymers. | | | | | | |
|---|---|---|---|---|---|---|
| | | | p | | | |
| Y | 2 | 4 | 6 | 8 | 12 | 18 |
| Cl or Br | s | s | ps | ps | ps | ns |
| Salicylate | s | ns | ns | ns | ns | ns | s = soluble,
ns = not soluble,
ps = partially soluble.

Representative copolymers prepared by copolymerization of the cationic monomers of the invention (i.e., hydrolysable precursors of zwitterionic monomers) and zwitterionic monomers include the copolymers of formula (VI) below.

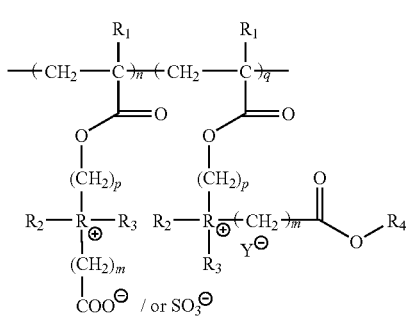

(VI)

Representative copolymers prepared by polymerization of hydrolysable precursors of mixed charged monomers include the copolymers of formula (VII) below.

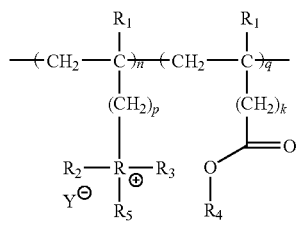

(VII)

For the polymers of formulas (VI) and (VII), $R_1$ is selected from hydrogen, methyl, and ethyl; $R_2$ and $R_3$ are independently selected from C1-C20 alkyl and fluoroalkyl; $R_4$ is selected from C1-C20 alkyl, C6-C12 aryl, tri(C1-C8 alkyl) silyl, alkyl copper, and alkyl zinc; m is an integer from 1 to 10; p is an integer from 1 to 10; k is an integer from 1 to 10; R is a cationic center selected from ammonium, imidazolium, triazaolium, pyridinium, morpholinium, oxazolidinium, pyrazinium, pyridazinium, pyrimidinium, piperazinium, and pyrrolidinium, and other nitrogen bases; Y is chloride, bromide, iodide, sulfate, nitrate, perchlorate ($ClO_4$), tetrafluoroborate ($BF_4$), hexafluorophosphate ($PF_6$), bis(trifluoromethylsulfonyl)amide($N[SO_2CF_3]_2$), trifluoromethylsulfonate ($SO_3CF_3$), C1-C20 carboxylate (R—C(=O)O$^-$), C1-C20 sulfonate (R—$SO_3^-$), lactate, salicylate, and derivatives thereof; n is 5 to about 100,000 and q is 5 to about 100,000.

In another embodiment, the marine coating includes nanoparticles formed from zwitterionic (hydrophilic) and hydrophobic copolymers contained in a matrix containing binder polymers. The nanoparticles are formed from block copolymers having zwitterionic and hydrophobic blocks, or random copolymerization of zwitterionic monomers with hydrophobic monomers. The nanoparticles can be mixed with binder polymers, including hydrolyzable polymers, as nonfouling marine coating compositions. The binder polymers are selected from rosins, acrylic polymers, polyesters, amino resins, polyurethanes, polyamides, polyimides, epoxy and phenolic resins, alkyd resins, polyphosphazenes, polysiloxanes, and their mixtures or their modified polymers thereof.

Representative copolymers prepared by having zwitterionic and hydrophobic blocks or a random copolymer prepared by copolymerization of zwitterionic and hydrophobic monomers include the copolymers of formula (VIII) below.

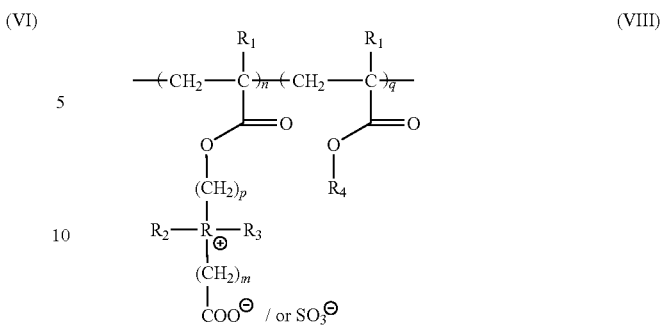

(VIII)

For the polymers of formula (VIII), $R_1$ at each occurrence is selected from hydrogen, methyl, and ethyl; $R_2$ and $R_3$ are independently selected from C1-C20 alkyl and fluoroalkyl; $R_4$ is selected from C1-C20 alkyl, C6-C12 aryl, tri(C1-C8 alkyl)silyl; m is an integer from 1 to 20; p is an integer from 1 to 20; and R is a cationic center selected from ammonium, imidazolium, triazaolium, pyridinium, morpholinium, oxazolidinium, pyrazinium, pyridazinium, pyrimidinium, piperazinium, and pyrrolidinium, and other nitrogen bases; n is 5 to about 100,000 and q is 5 to about 100,000.

The preparation of representative cationic copolymers useful in the invention having formula (VII) and their nonfouling properties are described in Example 6.

In a further embodiment, the marine coating includes amphiphilic polymers containing zwitterionic and fluorine-containing and/or silicone polymers. Amphiphilic polymers include fluorine-containing or/and silicone polymers combining zwitterionic monomer units or groups.

Representative amphiphilic polymers with grafted zwitterionic side chains containing perfluoroalkyl groups pendant to silicone main chains include the copolymers of formulas (IX) and (X) below.

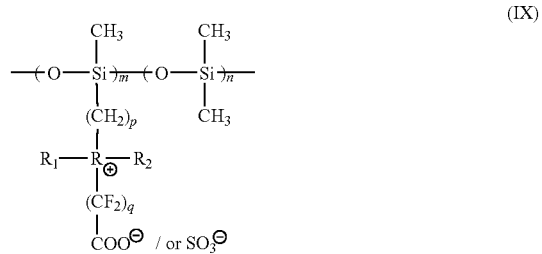

(IX)

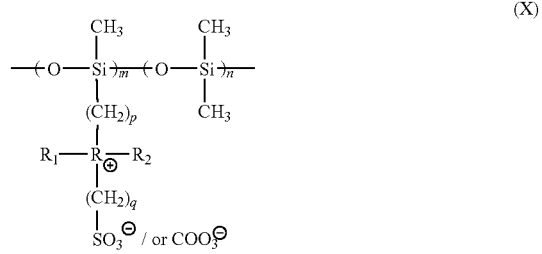

(X)

For polymers of formulas (IX) and (X), $R_1$ and $R_2$ are independently selected from C1-C20 alkyl and fluoroalkyl; p is an integer from 1 to 20; q is an integer from 1 to 20; and R is a cationic center selected from ammonium, imidazolium, triazaolium, pyridinium, morpholinium, oxazolidinium, pyrazinium, pyridazinium, pyrimidinium, piperazinium, and pyrrolidinium, and other nitrogen bases; m is 5 to about 100,000 and n is 2 to about 100,000. In one embodiment, p is an integer from 1 to 10. In one embodiment, q is an integer from 1 to 10.

The preparation of a representative polymer of the invention having a fluorinated zwitterionic pendant group grafted to a siloxane backbone is described in Example 7.

Representative amphiphilic polymers with grafted zwitterionic side chains containing perfluoroalkyl groups pendant to the polymer backbone include the copolymers of formulas (XI) and (XII) below.

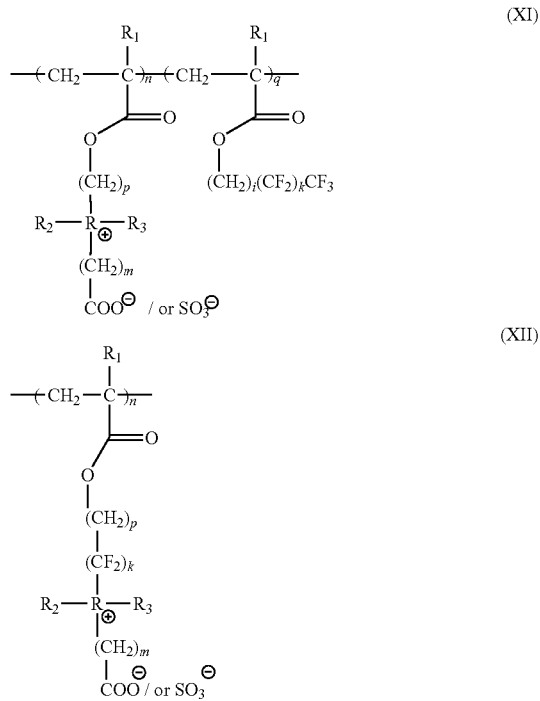

For the polymers of formulas (XI) and (XII), $R_1$ is selected from hydrogen, methyl, and ethyl; $R_2$ and $R_3$ are independently selected from C1-C20 alkyl and fluoroalkyl; m is an integer from 1 to 10; p is an integer from 1 to 10; k is an integer from 1 to 20; i is an integer from 1 to 20; and R is a cationic center selected from ammonium, imidazolium, triazaolium, pyridinium, morpholinium, oxazolidinium, pyrazinium, pyridazinium, pyrimidinium, piperazinium, and pyrrolidinium, and other nitrogen bases; n is 5 to about 100,000 and q is 5 to about 100,000.

As noted above, the nonfouling marine coatings include one or more of the following polymers: (1) cationic homopolymers (i.e., polymers prepared by polymerization of hydrolysable precursors of zwitterionic monomers); and (2) copolymers prepared by copolymerization of the cationic monomers of the invention (i.e., hydrolysable precursors of zwitterionic monomers) and zwitterionic or hydrophobic monomers. For these embodiments, the zwitterionic monomers are independently selected from polymerizable carboxybetaines, polymerizable sulfobetaines, polymerizable phosphobetaines, and other polymerizable zwitterionic compounds. The hydrolyzable precursors of zwitterionic monomers are selected from polymerizable cationic monomers containing hydrolyzable functional groups that on hydrolysis provide zwitterionic groups. The counterions of polymerizable cationic monomers noted above are selected from hydrophilic and/or hydrophobic anions, their mixtures, or modified hydrophilic and/or hydrophobic anions thereof. The mixed charged monomers are selected from polymerizable monomers having positively-charged cationic moieties and negatively-charged anionic moieties. The mixed charged monomers are selected from hydrolysable precursors of mixed charged monomer units, which can be hydrolyzed to mixed charged polymers. The backbones of the polymers noted above can be selected from acrylic polymers, acrylamide polymers, polyesters, amino resins, polyurethanes, polyamides, polyimides, epoxy and phenolic resins, alkyd resins, polyphosphazenes, polysiloxanes, and their mixtures or their modified polymers thereof.

The marine compositions of the invention can further include other fouling release materials (e.g., silicone and/or fluorine-containing coating materials) and/or antifouling materials (e.g., metallic compounds or biocides).

The following examples are provided for the purpose of illustrating, not limiting, the claimed invention.

EXAMPLES

Example 1

The Synthesis and Characterization of Representative Cationic Polymers

Materials. N-(3-dimethylaminopropyl)acrylamide (>98%) was purchased from TCI America, Portland, Oreg. Methyl bromoacetate (97%), ethyl 4-bromobutyrate (>97.0%), ethyl 6-bromohexanoate (99%), copper (I) bromide (99.999%), bromoisobutyryl bromide (BIBB 98%), 11-mercapto-1-undecanol (97%), and 2,2'-bipyridine (BPY 99%), and 2,2'-azobis(2-methylpropionitrile) (AIBN 98%) were purchased from Sigma-Aldrich. Fibrinogen (fraction I from bovine plasma) and phosphate buffer saline (PBS, pH7.4, 0.15 M, 138 mM NaCl, 2.7 mM KCl) were purchased from Sigma Chemical Co. Ethanol (absolute 200 proof) was purchased from AAPER Alcohol and Chemical Co. Water used in experiments was purified using a Millipore water purification system with a minimum resistivity of 18.0 MΩcm.

ω-Mercaptoundecyl bromoisobutyrate (1) was synthesized through reaction of BIBB and (2) using a method described in Ilker, M. F.; Nuesslein, K.; Tew, G. N.; Coughlin, E. B., "Tuning the Hemolytic and Antibacterial Activities of Amphiphilic Polynorbornene Derivatives," *Journal of the American Chemical Society* 126(48):15870-15875, 2004. 1H NMR (300 MHz, CDCl$_3$): 4.15 (t, J=6.9, 2H, OCH$_2$), 2.51 (q, J=7.5, 2H, SCH$_2$), 1.92 (s, 6H, CH$_3$), 1.57-1.72 (m, 4H, CH$_2$), and 1.24-1.40 (m, 16H, CH$_2$).

Cationic Monomer Syntheses

CBAA-1-ester: (2-carboxymethyl)-3-acrylamidopropyldimethylammonium bromide, methyl ester N-(3-dimethylaminopropyl)acrylamide (25 mmol), methyl bromoacetate (37.5 mmol), and acetonitrile (25 mL) were added into a 100-mL round-bottom flask. The mixture was stirred under a nitrogen atmosphere for 6 hr at room temperature. The precipitate was collected, washed with ca 500 mL of anhydrous acetone. The solvent was removed on a rotary evaporator to get a white powder (96% yield). 1H NMR (300 MHz, D$_2$O): 2.02 (m, 2H, —CH$_2$—), 3.25 (s, 6H, N$^+$(CH$_3$)$_2$), 3.37 (t, 2H, CH$_2$—N$^+$), 3.58 (m, 2H, CH$_2$—N), 3.79 (s, 3H, O—CH3), 4.29 (s, 2H, CH$_2$—C=O), 5.77 (m, 1H, CH═C—CON-trans); 6.19 (m, 1H, CH═C—CON-cis), 6.23 (m, 1H, ═CH—CON—).

CBAA-3-ester: (4-carboxypropyl)-3-acrylamidopropyldimethylammonium bromide, ethyl ester N-(3-dimethylaminopropyl)acrylamide (50 mmol), ethyl 4-bromobutyrate (60 mmol), and acetonitrile (25 mL) were added into a 100-mL round-bottom flask. The mixture was stirred under a nitrogen atmosphere for three days at room temperature. The solvent was removed on a rotary evaporator to get a colorless oil (92% yield). 1H NMR (300 MHz, $D_2O$): 1.22 (t, 3H $CH_3$), 2.00 (m, 4H, C—$CH_2$—C), 2.47 (t, 2H, $CH_2$—C═O), 3.06 (s, 6H, $N^+(CH_3)_2$), 3.28-3.35 (6H, $CH_2$—N and $CH_2$—$N^+$—$CH_2$), 4.14 (q, 2H, O—$CH_2$), 5.75 (m, 1H, CH═C—CON-trans); 6.19 (m, 1H, CH═C—CON-cis), 6.26 (m, 1H, ═CH—CON—).

CBAA-5-ester: (6-carboxypentyl)-3-acrylamidopropyldimethylammonium bromide, ethyl ester N-(3-dimethylaminopropyl)acrylamide (50 mmol), ethyl 6-bromohexanoate (55 mmol), and acetonitrile (25 mL) were added into a 100-mL round-bottom flask. The mixture was stirred under a nitrogen atmosphere for five days at 45° C. The solvent was removed on a rotary evaporator to get a slightly yellowish oil (87% yield). $^1$H NMR (300 MHz, $D_2O$): 1.20 (t, 3H $CH_3$), 1.34 (m, 2H, C—C—$CH_2$—C—C), 1.60-1.72 (4H, C—$CH_2$—C—$CH_2$—C), 2.00 (m, 2H, N—C—$CH_2$—C—N), 2.34 (t, 2H, $CH_2$—C═O), 3.04 (s, 6H, $N^+(CH_3)_2$), 3.24-3.37 (6H, $CH_2$—N and $CH_2$—$N^+$—$CH_2$), 4.12 (q, 2H, O—$CH_2$), 5.75 (m, 1H, CH═C—CON-trans); 6.20 (m, 1H, CH═C—CON-cis), 6.24 (m, 1H, ═CH—CON—).

Representative Cationic Polymer Syntheses

Surface-Initiated ATRP. Three monomers, CBAA-1-ester, CBAA-3-ester, and CBAA-5-ester, were grafted onto gold-coated SPR sensor chips or gold-coated silicon chips using surface-initiated ATRP. The preparation and characterization of the polymer brushes is described in Zhang, Z.; Chen, S.; Chang, Y.; Jiang, S., "Surface Grafted Sulfobetaine Polymers via Atom Transfer Radical Polymerization as Superlow Fouling Coatings" Journal of Physical Chemistry B 110(22): 10799-10804, 2006, and Zhang, Z.; Chen, S.; Jiang, S., "Dual-Functional Biomimetic Materials: Nonfouling Poly (carboxybetaine) with Active Functional Groups for Protein Immobilization" Biomacromolecules 7(12):3311-3315, 2006. previous publications. Briefly, CuBr (1 mmol) and a SPR chip or a gold disk with a Br-thiol SAM was placed in a nitrogen-purged reaction tube. Degassed solution (pure water and methanol in a 1:1 volume ratio, 10 mL) with CBAA ester (6.5 mmol), and BPY (2 mmol, in 5 mL degassed methanol) were transferred to the tube using a syringe. After reaction for more than 1 hour under nitrogen, the SPR chip or gold disk was removed and rinsed with ethanol, water and PBS solution. The samples were stored in PBS solutions before testing.

Polymer Synthesis and Characterization

CBAA-1-ester solution of ca. 0.3 M in methanol was purged with nitrogen for 30 min. The polymerization was then performed at 60° C. for ca 48 hours under nitrogen using 3 mol % AIBN as an initiator to provide polyCBAA-1-ester. Similar methods were applied for preparation of polyCBAA-3-ester or polyCBAA-5-ester using ethanol as a solvent. The polymers were washed with ethyl ether and the solvent was then removed. The structures of the polymers were confirmed by NMR. 1H NMR (300 MHz, $D_2O$): polyCBAA-1-ester: 1.62 (br, 2H), 2.05 (br, 3H), 3.25-3.32 (br, 8H), 3.62 (br, 2H), 3.83 (s, 3H), 4.38 (s, 2H); polyCBAA-3-ester 1.21 (t, 3H), 1.61 (br, 2H), 2.04 (br, 5H), 2.50 (t, 2H), 3.37 (br, 6H), 3.12 (s, 6H), 4.14 (q, 2H); polyCBAA-5-ester: 1.22 (t, 3H), 1.37 (m, 2H), 1.62-1.80 (br m, 6H), 2.01 (br, 3H), 2.39 (t, 2H), 3.03 (s, 6H), 3.24 (br m, 6H), 4.12 (q, 2H).

The molecular weight of linear polyCBAA was estimated using a Waters Alliance 2695 Separations Module equipped with a Waters Ultrahydrogel 1000 column and detected with a Waters 2414 Reflex Detector. The mobile phase was an aqueous solution at a flow rate of 0.5 mL/min. The instrument and column were calibrated with poly(ethylene oxide) standards from Polymer Laboratories. All measurements were performed at 35° C. The molecular weight of the polymer was calculated using Empower Pro from Waters.

Example 2

Representative Cationic Polymer Hydrolysis

The cationic polymers prepared as described in Example 1 were dissolved in NaOH solutions with different concentration (10 mM, 100 mM, and 1 M) in a concentration of 50 mg/mL. After an appropriate time interval, the polymer solutions were neutralized with dilute HCl solution and the water was removed by vacuum $^1$H NMR spectroscopy ($D_2O$) was performed to measure the degradation rate by determining the amount of intact ester groups and comparing with other non-hydrolyzable pendant groups as inner standards. The results are illustrated in FIG. 3.

Example 3

Representative Cationic Polymer Protein Adsorption and Release

The cationic polymers prepared as described in Example 1 were evaluated for protein adsorption by surface plasmon resonance (SPR).

Protein adsorption was measured with a custom-built SPR sensor, which is based on wavelength interrogation. A SPR chip was attached to the base of the prism, and optical contact was established using refractive index matching fluid (Cargille). A dual-channel flow cell with two independent parallel flow channels was used to contain liquid sample during experiments. A peristaltic pump (Ismatec) was utilized to deliver liquid sample to the two channels of the flow cell. Fibrinogen solution of 1.0 mg/mL in PBS (0.15M, pH 7.4) was flowed over the surfaces at a flow rate of 0.05 mL/min A surface-sensitive SPR detector was used to monitor protein-surface interactions in real time. Wavelength shift was used to measure the change in surface concentration (mass per unit area). The results are illustrated in FIGS. 5A-5C.

Example 4

Representative Cationic Polymer Antimicrobial Properties

The cationic polymers prepared as described in Example 1 were evaluated for their antimicrobial properties.

E. coli K12 were first cultured in separate pure cultures overnight at 37° C. on LB agar plates, which was then incubated with shaking at 37° C. for 24 h. Cultures on agar plates can be used for two weeks, if kept at 4° C. Several colonies were used to inoculate 25 ml of LB (20 g/L). These initial cultures were incubated at 37° C. with shaking at 100 rpm for 18 hours and were then used to inoculate a second culture of each species in 200 ml of appropriate medium. When the second suspended culture reached an optical density of 1.0 at 600 nm, bacteria were collected by centrifugation at 8,000×g for 10 min at 4° C. Cell pellets were washed three times with sterile phosphate buffered saline (PBS, pH7.4) and subsequently suspended in PBS to a final concentration of $10^8$ cells/mL.

Figure 6:
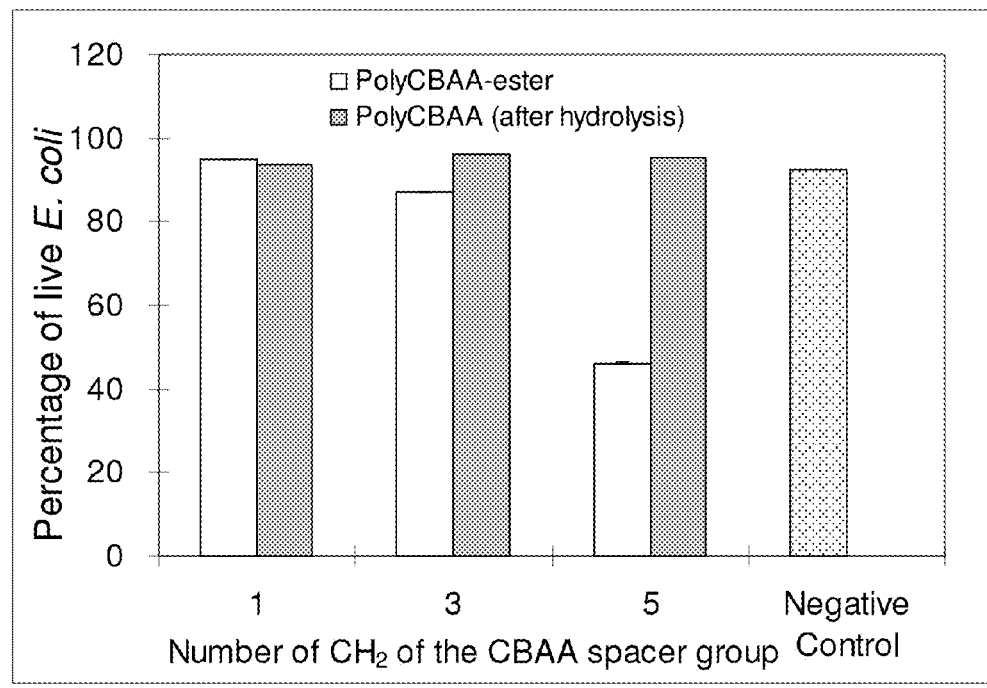
FIG. 6 is a graph comparing antimicrobial activities of three representative cationic polymers useful in the invention, polyCBAA-esters, before and after hydrolysis. *E. coli* ($10^8$ cells/mL) was incubated with each polymer solution (repeat unit molar concentration: 2 mM) for 30 min. PBS buffer (pH 7.4 and 150 mM) is used as a negative control.

Exposure of bacterial cells to representative polymer solutions was started when the culture containing bacterial cells was added to above polymer suspension which was pre-equilibrated and shaken at 30° C., and the mixture were incubated at room temperature for 30 min. The final solution contains ca. $10^8$ cells/mL E. coli and 2 mM repeat unit concentration, which is the molar concentration of the repeat unit of the polymers (ca. 0.6-0.76 mg/mL based on molecular weight of CBAAs and CBAA-esters). Bacteria were stained with Live/Dead BacLight™ (Invitrogen, USA), and bacterial suspension was subsequently filtered through a polycarbonate membrane filter with 0.2 µm pore size (Millipore, USA), and observed directly with a CCD-CoolSNAP camera (Roper scientific, Inc., USA) mounted on Nikon Eclipse 80i with 100× oil lens. The number of live and dead cells was determined, respectively, through FITC and Rhodamine filters with the same microscope described in Cheng, G.; Zhang, Z.; Chen, S.; Bryers, J. D.; Jiang, S., "Inhibition of Bacterial Adhesion and Biofilm Formation on Zwitterionic Surfaces," *Biomaterials* 28(29):4192-4199, 2007. The results are illustrated in FIG. 6.

Example 5

Preparation and Properties of a Representative Marine Coating Composition: Cationic Polymer Having Hydrophobic Counter Ion The preparation of a representative cationic polymer having a hydrophobic counter ion and that is useful as a component in a marine coating is described. The hydrolysis, self-polishing, and nonfouling properties of the coating are also described.

Figure 16:
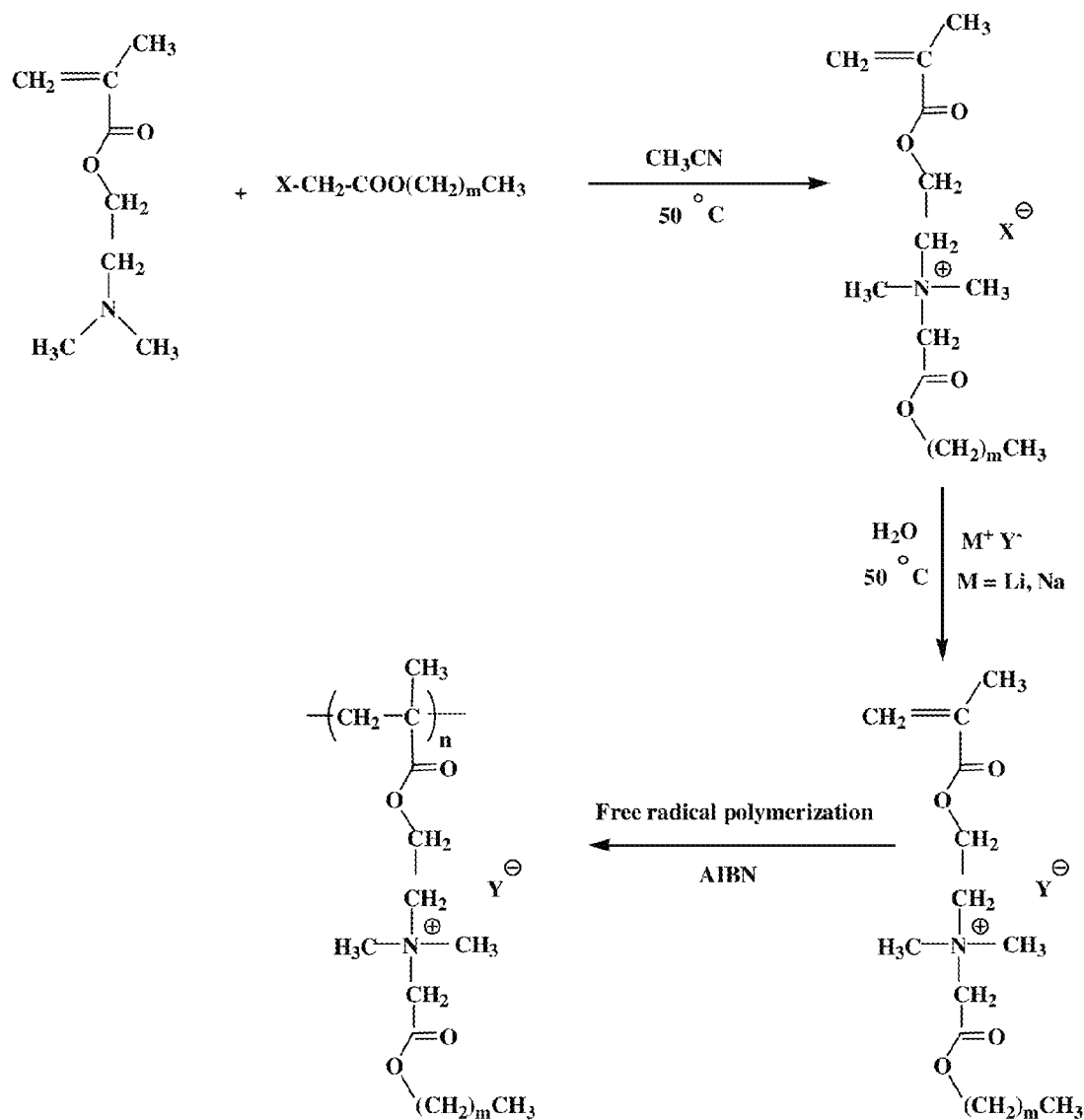
FIG. 16 is a schematic illustration of the preparation of representative cationic monomers and polymers useful in the invention having ion exchanged counter ions Y$^-$ (e.g., hydrophobic counter ions).

The preparation of the representative cationic monomer and polymer (i.e., carboxybetaine methacrylate ester (CBMA-ester) monomer and polymer) and ion exchange with hydrophobic ions are illustrated in FIG. 16 and described below.

Alkyl chloroacetates. Alkyl chloroacetates were prepared by refluxing chloroacetate acid with corresponding alkyl alcohol in the presence of sulfuric acid and benzene as solvent for overnight. The obtained esters of chloroacetic acid were purified by vacuum distillation and obtained in yields around 70~95%.

Dodecyl chloroacetate. The mixture of 1-dodecanol (0.2 mol, 37.27 g), chloroacetic acid (0.2 mol, 18.9 g), benzene (200 ml) and sulfuric acid (2 ml) was refluxed for 12 hrs. After the reaction, the mixture was washed with 25% $Na_2CO_3$ (100 ml). The organic layer was dried with magnesium sulfate and then evaporated, the remaining liquid was distilled under vacuum to provide a colorless oil (bp 150° C./3 mmHg) in 90% yield.

N-(methacryloxyethyl-N-(alkyl acetate)-N,N-dimethyl-ammonium chloride. The cationic compounds of N-(methacryloxyethyl-N-(alkyl acetate)-N,N-dimethyl-ammonium chloride were prepared in nearly quantitative yields from alkyl chloroacetates and 2-(dimethylamino)ethyl methacrylate.

N-(methacryloxyethyl-N-(dodecyl acetate)-N,N-dimethyl-ammonium chloride. 2-(dimethylamino)ethyl methacrylate (0.05 mol, 7.86 g), dodecyl chloroacetate (0.06 mol, 15.75 g), acetonitrile (50 ml) were heated to 50° C. for two days. After reaction the solvent was evaporated and the remaining compound was washed with ether to provide a white solid in 98% yield.

CBMA-ester monomers with hydrophobic ions. The carboxybetaine methacrylate ester (CBMA-ester) monomers with hydrophobic anions were synthesized with metathesis reaction method.

N-(methacryloxyethyl-N-(dodecyl acetate)-N,N-dimethyl-ammonium salicylate. A mixture of N-(methacryloxyethyl-N-(dodecylacetate)-N,N-dimethylammonium chloride (0.1 mol, 41.9 g), salicylic acid sodium (0.12 mol, 19.2 g), and water (400 ml) was heated to 50° C. for two days. After reaction, the mixture was extracted with chloroform (500 ml) and the chloroform extract dried with magnesium sulfate, filtered, and then evaporated to dryness to provide a white solid, N-(methacryloxyethyl-N-(dodecyl acetate)-N,N-dimethyl-ammonium salicylate, in 90% yield.

CBMA-ester polymers. The carboxybetaine methacrylate ester (CBMA-ester) monomers were polymerized by the free radical polymerization method.

Polymerization of N-(methacryloxyethyl-N-(dodecylacetate)-N,N-dimethyl-ammonium salicylate. Under the protection of nitrogen gas, monomer N-(methacryloxyethyl-N-(dodecylacetate)-N,N-dimethyl-ammonium salicylate (0.1 mol, 46.4 g) was placed in a 500 ml flask and chloroform (250 ml) was added. After heating the mixture to 65° C. for 10 min, initiator AIBN (2,2'-azo-bis(isobutyronitrile)) (0.47 g) was added to the solution. The reaction was run for 24 hr, then poured into hexane (2L). The polymer was precipitated in the solution. After filtering and drying, the polymer was obtained as white solid in 85% yield.

Figure 17:
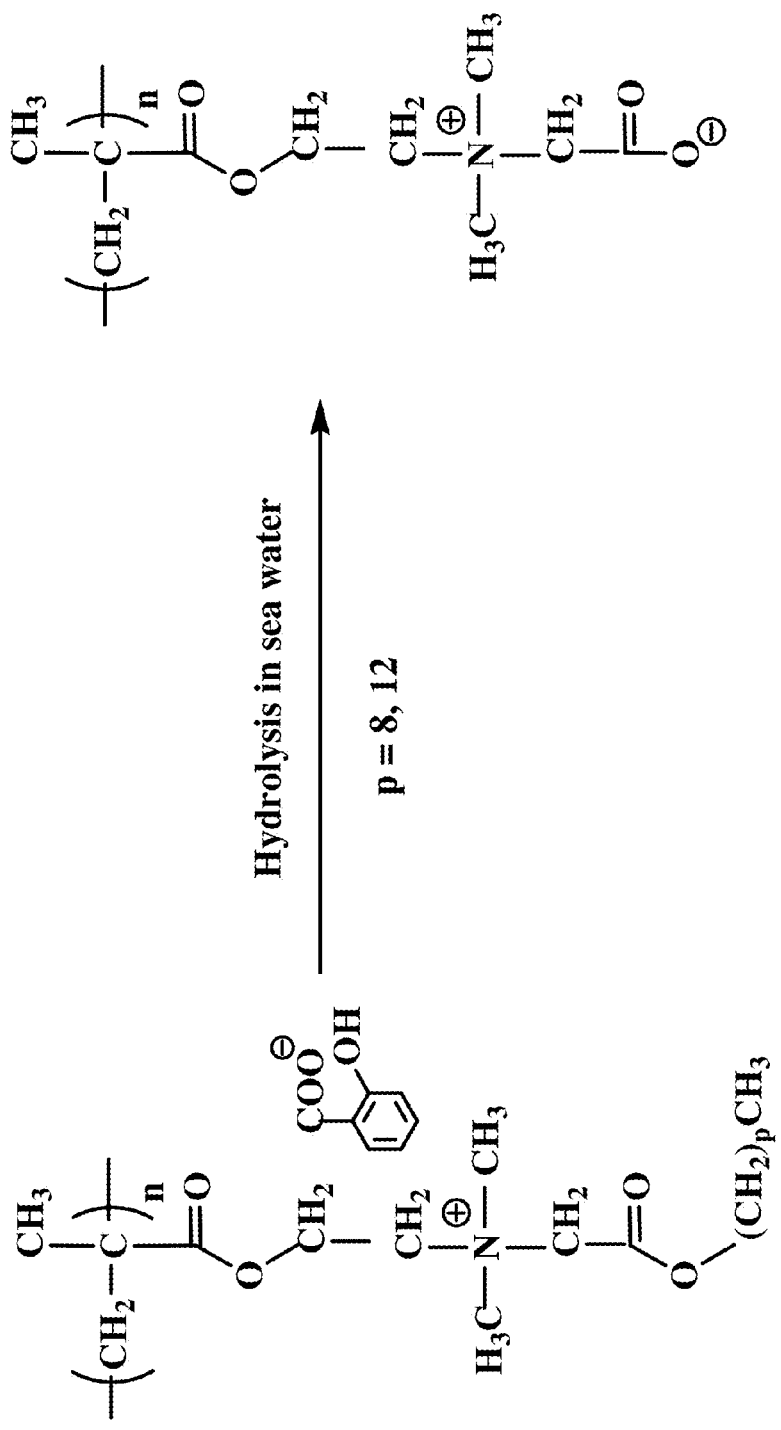
FIG. 17 illustrates the seawater hydrolysis of representative cationic polymers useful in the invention having hydrophobic counter ion (salicylate) and leaving group, $CH_3(CH_2)_7$ OH or $CH_3(CH_2)_{11}$OH: hydrolysis of cationic polycarboxybetaine esters to zwitterionic polycarboxybetaine.

The obtained polymers, such as poly(N-(methacryloxyethyl-N-(dodecyl acetate)-N,N-dimethylammonium salicylate), are hydrophobic and, depending on the size of the ester group and the type of hydrophobic ion, may not dissolve in water. These hydrophobic polymers can be hydrolyzed to hydrophilic poly(carboxybetaine methacrylate) (CBMA) under seawater conditions (see FIG. 17). The solubility of representative cationic polymers useful in the invention in water is set forth in Table 2.

Figure 18:
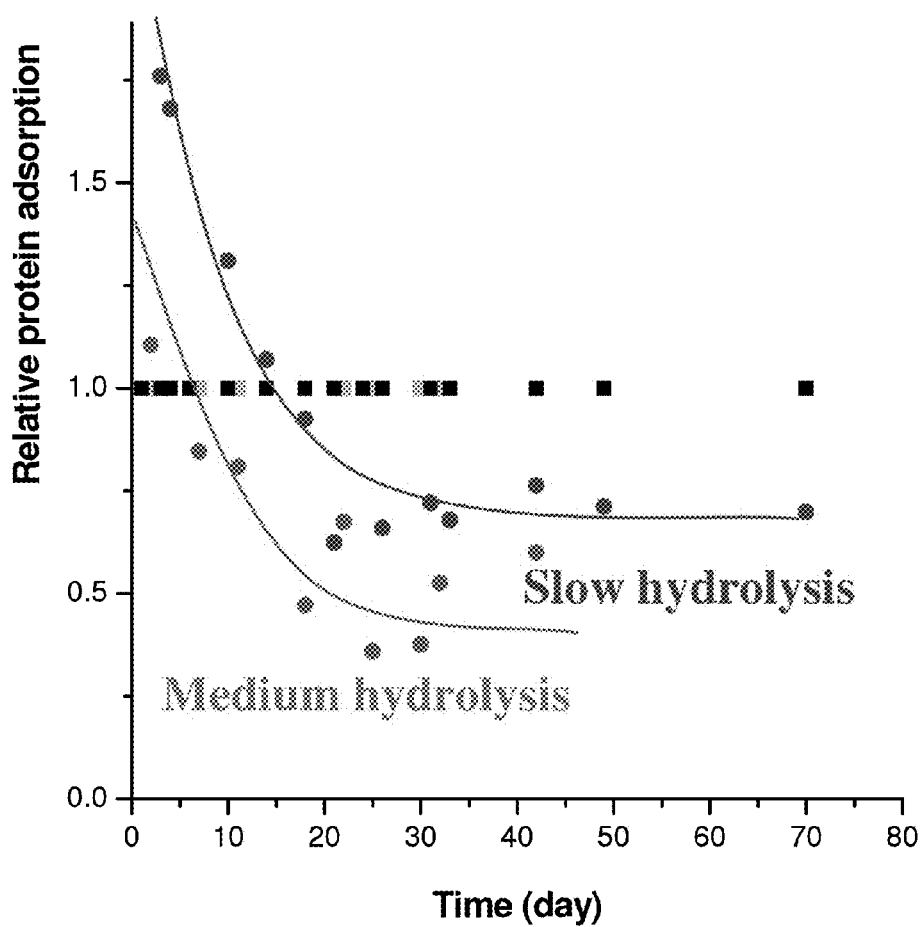
FIG. 18 compares relative protein adsorption as a function of hydrolysis (time exposed to artificial seawater, 0.6 M sodium chloride at pH 8.2) for surfaces coated with cationic polymers illustrated in FIG. 17 (m=7 and m=11), slow hydrolysis for cationic polymer with m=11 and medium hydrolysis for cationic polymer with m=7. Relative protein adsorption was determined by horseradish peroxidase-anti-fibrinogen ELISA.
Figure 19:
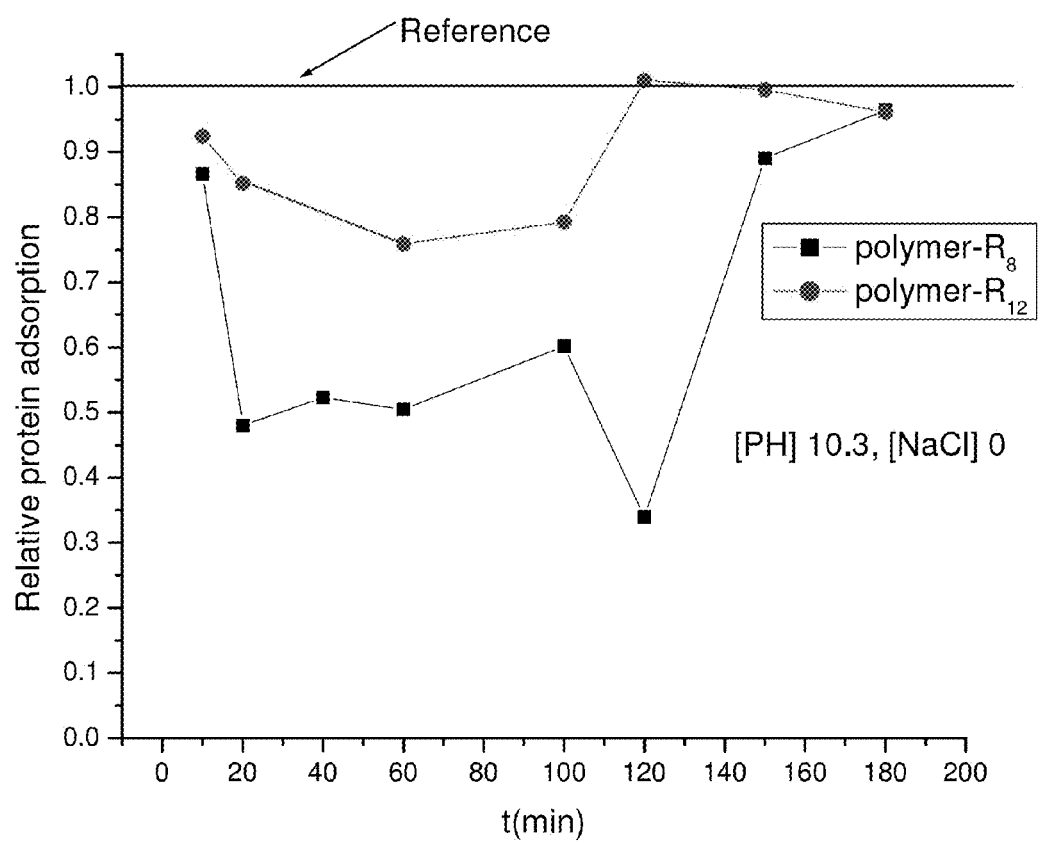
FIG. 19 compares relative protein adsorption as a function of time (solution at pH 10.3) for surfaces coated with cationic polymers illustrated in FIG. 17 (m=7 and m=11). Relative protein adsorption was determined by horseradish peroxidase-anti-fibrinogen ELISA.
Figure 20A:
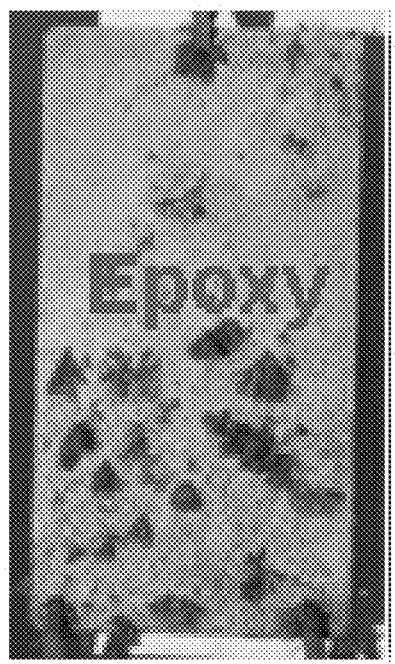
Figure 20B:
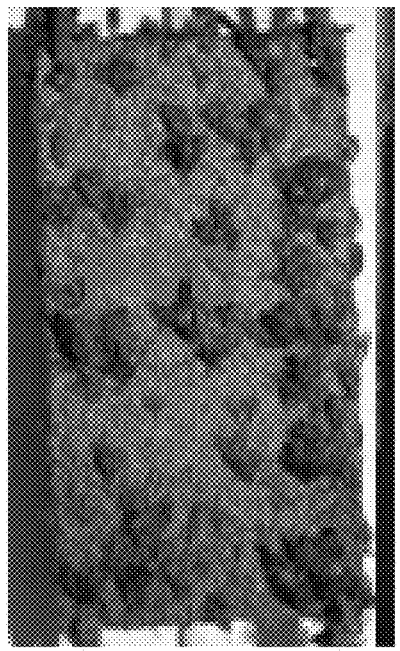
Figure 20F:
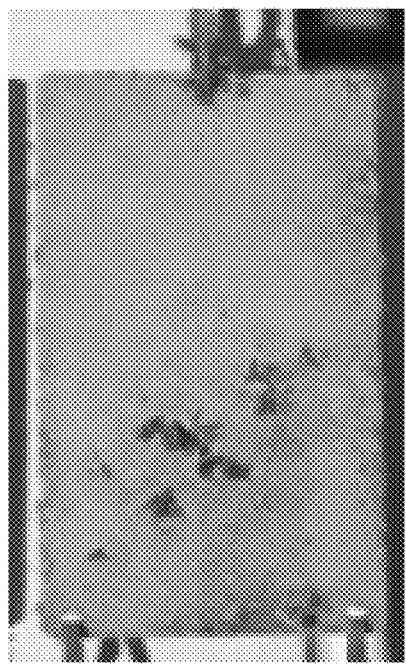

Nonfouling Properties of Representative Marine Coating. The hydrophobic poly(CBMA-ester)s were spin-coated onto panels (10 mm×10 mm) for protein adsorption experiments, which were tested with enzyme linked immunosorbent assay (ELISA). It was found that fibrinogen adsorption could be reduced to a level of 30~40% with increasing hydrolysis time in artificial sea water (see FIG. 18) and in basic solution (accelerated experiments, see FIG. 19). These hydrophobic polymers (with p=2-18 and Y=salicylate ion, see Table 2 and FIG. 17) were spray-coated onto panels (4"×8") with epoxy as primer. Examples for results from field tests in Florida are shown in FIG. 20. For field tests in Florida, static immersion panels were exposed in the Indian River Lagoon near Sebastian Inlet between April and May 2008. All panels were held 1 meter under the surface within ½" galvanized mesh caging. Digital photographs were taken of these panels (see FIG. 20).

Example 6

Preparation and Properties of a Representative Marine Coating Composition: Nanoparticles from Block Copolymers The preparation of a representative nanoparticles that are useful as a component in a marine coating is described. The nonfouling properties of the coating are also described.

Figure 21:
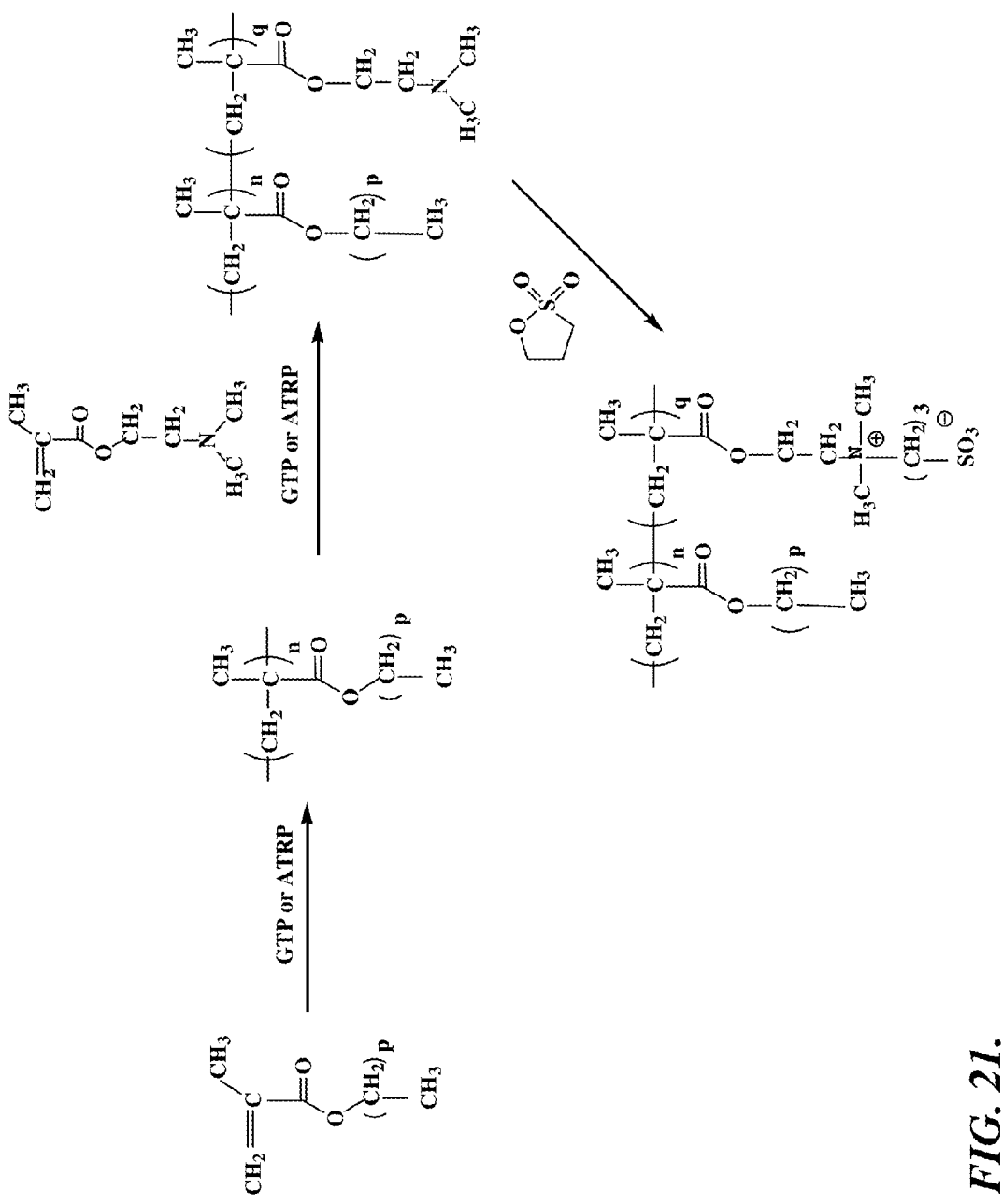
FIG. 21 is a schematic illustration of the preparation of representative block polymer of the invention having a zwitterionic block (sulfobetaine) and a hydrophobic block (methacrylate $C_p$ ester).

The preparation of the representative block copolymer having a zwitterionic block (sulfobetaine) and a hydrophobic block is illustrated in FIG. 21 and described below. Referring to FIG. 21, the hydrophobic block is prepared by polymerization of alkyl methacrylate. The hydrophobic block can be prepared by group transfer polymerization (GTP) or atom transfer radical polymerization (ATRP) method. The diblock copolymer is prepared by GTP or ATRP with the hydrophobic block and an amine monomer to provide a diblock copolymer that is then quaternized to provide the diblock copolymer having a zwitterionic block and a hydrophobic block.

The diblock copolymers of sulfobetaine methacrylate and alkyl methacrylates can be synthesized by group transfer polymerization (GTP) or atom transfer radical polymerization (ATRP) method followed by quaternization with 1,3-propanesultone to obtain corresponding zwitterion-containing diblock copolymers in high yield.

On approach for the synthesis of block copolymer of dodecyl methacrylate and sulfobetaine methacrylate by ATRP method is as follows.

Block 1. To a Schlenk flask containing toluene (100 ml) was added Cu(I) Br (0.002 mol, 0.29 g), 2,2'-dipyridyl (0.006 mol, 0.95 g) and dodecyl methacrylate (0.1 mol, 25 g). The solution was degassed for 15 min and heated to 90° C. for 10 min. Then, methyl 2-bromopropionate (0.002 mol, 0.334 g) was added to the solution. After reaction, the catalyst residues were removed by filtering through a column of basic alumina prior to gel permeation chromatographic (GPC) analysis. The polymers were isolated by precipitation into methanol. Conversion was measured by gravimetry by drying to constant weight in a vacuum oven at 50° C.

Block 2. To a Schlenk flask containing toluene (100 ml) was added Cu(I) Cl (0.002 mol, 0.20 g), PMDETA (1,1,4,7,7-pentamethyl diethylene triamine) (0.002 mol, 0.35 g) and polymer obtained from Block 1 (20 g). The solution was degassed for 15 min and heated to 90° C. for 10 min. Then, monomer 2-(dimethylamino)ethyl methacrylate (0.13 mol, 20 g) was added to the solution. After reaction, the catalyst residues were removed by filtering through a column of basic alumina prior to GPC analysis. The polymers were isolated by precipitation into methanol. Conversion was measured by gravimetry by drying to constant weight in a vacuum oven at 50° C. The obtained block polymer was added to THF (200 ml), and excess 1,3-propanesulfone was added. The mixture was stirred at room temperature for 24 hr to obtain the corresponding zwitterion-containing diblock copolymer. The obtained block copolymer undergoes spontaneous self-assembly in hydrophobic organic solvents or in aqueous solution to form nanoparticles.

Figure 22C:
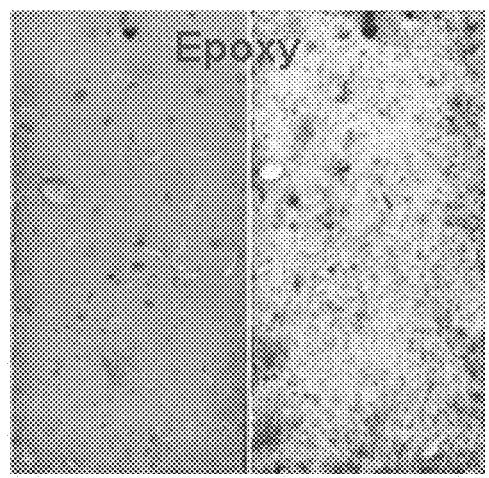
Figure 22C:
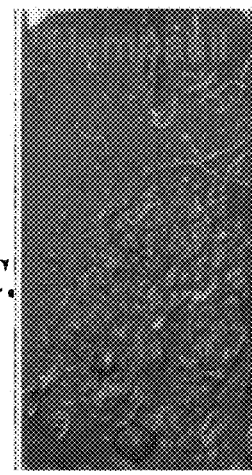
Figure 22D:
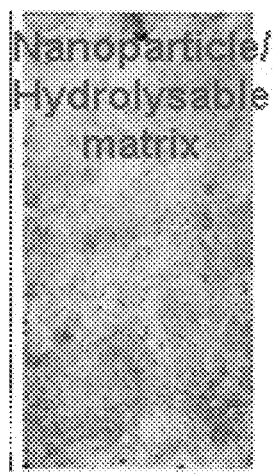

Marine Coating. The nanoparticles were mixed with hydrolyzable silyl ester binder polymers and coated on panels. Results from field tests in Hawaii are illustrated in FIG. 22. For field tests in Hawaii, the test site was a pier on the south side of Ford Island, Pearl Harbor, Honolulu, Ha. Panels were hung from racks mounted on pilings beneath the pier. Panels were exposed to a diverse community of fouling organisms and recruitment between May and June 2008.

Example 7

Preparation and Properties of a Representative Marine Coating Composition: Siloxane Coating The preparation of a zwitterionic graft polymer of fluorinated carboxybetaine and polymethylhydrosiloxane that is useful as a component in a marine coating is described.

Figure 23:
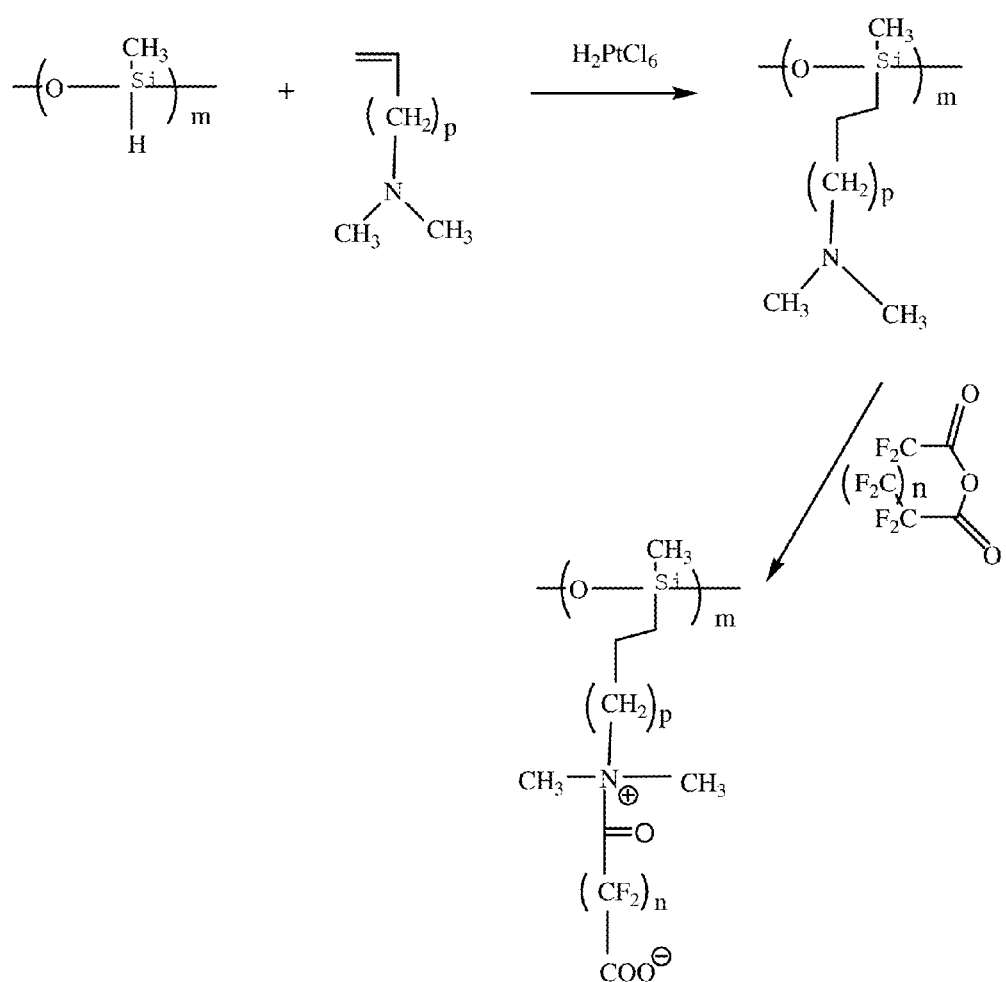
FIG. 23 is a schematic illustration of the preparation of representative siloxane polymer of the invention having a zwitterionic pendant group containing a fluoroalkyl moiety $(-CF_2)_n-$).

The preparation of the representative zwitterionic graft polymer is illustrated in FIG. 23 and described below.

Fluorine-containing zwitterionic alkenes can be added to polymethylhydrosiloxane or other silicone derivatives using $H_2PtCl_6$ as a catalyst. The obtained polymers have amphiphilic characteristics with good antifouling and fouling release properties. One approach for the preparation of grafting fluorine-containing zwitterionic compound to polymethylhydrosiloxane is as follows.

Synthesis of poly(methylalkylsiloxanes) was performed by a hydrosilation reaction of poly(methylhydrosiloxane) with α-olefins of varying lengths. A three-necked round-bottomed flask equipped with a thermometer, a mechanical agitator, and a nitrogen purge was charged with poly(methylhydrosiloxane) (20 g) and excess α-olefin in dry toluene (100 ml). Chloroplatinic acid (hydrogen hexachloroplatinate (IV) (150 ppm) was then added to the reaction mixture, which was maintained at 60° C. for 3 days. The reaction mixture was filtered to remove the catalyst, refluxed with activated charcoal for 1 h and filtered. The solvent was removed under reduced pressure. Excess α-olefin was removed under a vacuum. Finally, the polymer was dissolved in dry toluene (100 ml) again, excess multifluoroglutaric anhydride was added to the solution and heated at room temperature for 2 days to obtain the final fluorinated zwitterionic graft polymer.

While illustrative embodiments have been illustrated and described, it will be appreciated that various changes can be made therein without departing from the spirit and scope of the invention.

The embodiments of the invention in which an exclusive property or privilege is claimed are defined as follows:

1. A marine substrate, comprising a polymer coating, wherein the polymer has the formula:

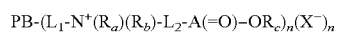

PB-(L$_1$-N$^+$(R$_a$)(R$_b$)-L$_2$-A(=O)–OR$_c$)$_n$(X$^-$)$_n$ wherein
PB is a polymer backbone;
N$^+$ is a cationic center;
R$_a$ and R$_b$ are independently selected from hydrogen, alkyl, and aryl;
A(=O)—OR$_c$ is a hydrolyzable group, wherein A is selected from the group consisting of C, S, SO, P, or PO, and R$_c$ is an alkyl, aryl, acyl, or silyl group that may be further substituted with one or more substituents;
L$_1$ is a linker that covalently couples the cationic center to the polymer backbone;
L$_2$ is a linker that covalently couples the cationic center to the hydrolyzable group; X— is a counter ion associated with the cationic center; and n is an integer from about 10 to about 10,000.

2. The marine substrate of claim 1, wherein the counter ion is a hydrophobic organic counter ion.

3. The marine substrate of claim 1, wherein the counter ion is selected from the group consisting of C1-C20 carboxylates and C1-C20 alkylsulfonates.

4. The marine substrate of claim 1, wherein the counter ion is biologically active.

5. The marine substrate of claim 1, wherein the counter ion is selected from the group consisting of an antimicrobial, an antibacterial, and an antifungal agents.

6. The marine substrate of claim 1, wherein the counter ion is salicylate.

7. The marine substrate of claim 1, wherein the hydrolyzable group releases a hydrophobic organic group on hydrolysis.

8. The marine substrate of claim 1, wherein the hydrolyzable group releases a C1-C20 carboxylate on hydrolysis.

9. The marine substrate of claim 1, wherein $R_a$ and $R_b$ are independently selected from the group consisting of C1-C10 straight chain and branched alkyl groups.

10. The marine substrate of claim 1, wherein $L_1$ is selected from the group consisting of —C(=O)O—(CH$_2$)$_n$— and —C(=O)NH—(CH$_2$)$_n$—, wherein n is an integer from 1 to 20.

11. The marine substrate of claim 1, wherein $L_2$ is —(CH$_2$)$_n$—, where n is an integer from 1 to 20.

12. The marine substrate of claim 1, wherein A is selected from the group consisting of C, SO, and PO.

13. The marine substrate of claim 1, wherein $R_c$ is C1-C20 alkyl.

14. The marine substrate of claim 1, wherein X— is selected from the group consisting of halide, carboxylate, alkylsulfonate, sulfate, nitrate, perchlorate, tetrafluoroborate, hexafluorophosphate, trifluoromethylsulfonate, bis(trifluoromethylsulfonyl)amide, lactate, and salicylate.

15. The marine substrate of claim 1, wherein the marine substrate is a vessel hull.

16. The marine substrate of claim 1, wherein the marine substrate is a propeller, periscope of sensor.

17. The marine substrate of claim 1, wherein the marine substrate is a bridge.

18. The marine substrate of claim 1, wherein the marine substrate is a fish net.

19. A method for treating a surface of a marine substrate, comprising applying a polymer coating, wherein the polymer has the formula:

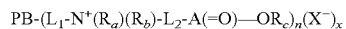

wherein

PB is a polymer backbone;

N$^+$ is a cationic center;

$R_a$ and $R_b$ are independently selected from hydrogen, alkyl, and aryl;

A(=O)—OR$_c$ is a hydrolyzable group, wherein A is selected from the group consisting of C, S, SO, P, or PO, and R$_c$ is an alkyl, aryl, acyl, or silyl group that may be further substituted with one or more substituents;

$L_1$ is a linker that covalently couples the cationic center to the polymer backbone;

$L_2$ is a linker that covalently couples the cationic center to the hydrolyzable group; X— is a counter ion associated with the cationic center; and n is an integer from about 10 to about 10,000.

20. The method of claim 19, wherein applying the coating comprises spraying the coating.

21. The method of claim 19, wherein applying the coating comprises painting the coating.

22. The method of claim 19, wherein the substrate is a vessel hull or marine structure.

* * * * *

UNITED STATES PATENT AND TRADEMARK OFFICE
CERTIFICATE OF CORRECTION

PATENT NO. : 8,349,966 B2  
APPLICATION NO. : 12/780251  
DATED : January 8, 2013  
INVENTOR(S) : S. Jiang et al.

Page 1 of 2

It is certified that error appears in the above-identified patent and that said Letters Patent is hereby corrected as shown below:

COLUMN     LINE

In the Claims 30     47  
(Claim 1,    lines 15-18)

The final clause of Claim 1:

"L2 is a linker that covalently couples the cationic center to the hydrolyzable group; X— is a counter ion associated with the cationic center; and n is an integer from about 10 to about 10,000."

should break as follows:

--L2 is a linker that covalently couples the cationic center to the hydrolyzable group;

X— is a counter ion associated with the cationic center; and n is an integer from about 10 to about 10,000.--

30     48  
(Claim 1,    line 16)

"X— is" should read --X- is--

31     14  
(Claim 14,    line 1)

"X— is" should read --X- is--

31     23  
(Claim 16,    line 2)

"periscope of sensor." should read --periscope, or sensor.--

Signed and Sealed this  
Tenth Day of June, 2014

Michelle K. Lee  
*Deputy Director of the United States Patent and Trademark Office*

CERTIFICATE OF CORRECTION (continued)
U.S. Pat. No. 8,349,966 B2

| COLUMN | LINE | |
|---|---|---|
| 32<br>(Claim 19, | 16<br>lines 16-19) | The final clause of Claim 19:<br><br>"L2 is a linker that covalently couples the cationic center to the hydrolyzable group; X— is a counter ion associated with the cationic center; and n is an integer from about 10 to about 10,000."<br><br>should break as follows:<br><br>--L2 is a linker that covalently couples the cationic center to the hydrolyzable group;<br><br>X— is a counter ion associated with the cationic center; and<br><br>n is an integer from about 10 to about 10,000.-- |
| 32<br>(Claim 19, | 17<br>line 17) | "X— is" should read --X- is-- |